(12) United States Patent
Lovell et al.

(10) Patent No.: US 7,183,235 B2
(45) Date of Patent: Feb. 27, 2007

(54) HIGH CAPACITY REGENERABLE SORBENT FOR REMOVING ARSENIC AND OTHER TOXIC IONS FROM DRINKING WATER

(75) Inventors: John Stanley Lovell, Arvada, CO (US); Thomas E. Broderick, Arvada, CO (US); Craig S. Turchi, Lakewood, CO (US); Amanda K. Kimball, Lakewood, CO (US)

(73) Assignee: ADA Technologies, Inc., Littleton, CO (US)

( * ) Notice: Subject to any disclaimer, the term of this patent is extended or adjusted under 35 U.S.C. 154(b) by 70 days.

(21) Appl. No.: 10/600,117

(22) Filed: Jun. 20, 2003

(65) Prior Publication Data

US 2006/0030476 A1      Feb. 9, 2006

Related U.S. Application Data

(60) Provisional application No. 60/390,707, filed on Jun. 21, 2002.

(51) Int. Cl.
   *B01J 20/10*   (2006.01)
   *B01J 21/16*   (2006.01)

(52) U.S. Cl. .......................... 502/410; 502/84; 502/80

(58) Field of Classification Search .................. 502/80, 502/84, 410
   See application file for complete search history.

(56) References Cited

U.S. PATENT DOCUMENTS

| | | | |
|---|---|---|---|
| 1,697,095 A | 1/1929 | Turner | |
| 2,145,901 A | 2/1939 | Shoemaker | 210/23 |
| 2,367,496 A | 1/1945 | Greentree | 252/299 |
| 2,860,952 A | 11/1958 | Bergeron et al. | 23/134 |
| 3,194,629 A | 7/1965 | Dreibelbis et al. | 23/2 |
| 3,201,149 A | 8/1965 | Bragg | 285/39 |
| 3,232,033 A | 2/1966 | Williston et al. | 55/387 |
| 3,257,776 A | 6/1966 | Park et al. | 55/72 |
| 3,374,608 A | 3/1968 | Manes | 55/72 |
| 3,499,837 A | 3/1970 | Jaunarajs | 210/59 |
| 3,516,947 A | 6/1970 | Dudzik | 252/439 |
| 3,576,947 A | 5/1971 | Kruger | 178/69.5 |
| 3,674,428 A | 7/1972 | Dean et al. | 23/134 |
| 3,677,696 A | 7/1972 | Bryk et al. | 23/2 |
| 3,740,331 A | 6/1973 | Anderson et al. | 210/53 |
| 3,749,761 A | 7/1973 | Dean et al. | 423/562 |
| 3,755,161 A | 8/1973 | Yokota et al. | 210/36 |
| 3,790,370 A | 2/1974 | Lalancette | 75/108 |
| 3,835,217 A | 9/1974 | Dunsmoor | 423/499 |
| 3,847,598 A | 11/1974 | Coulter et al. | 75/121 |
| 3,857,704 A | 12/1974 | Coulter | 75/121 |
| 3,864,327 A | 2/1975 | Marchant | 260/231 A |
| 3,873,581 A | 3/1975 | Fitzpatrick et al. | 260/370 |
| 3,876,451 A | 4/1975 | Zall | 117/62 |
| 3,890,225 A | 6/1975 | Kajiyama | 210/38 |
| 3,935,098 A | 1/1976 | Oda et al. | 210/38 |
| 3,947,354 A | 3/1976 | Swanson et al. | 210/53 |
| 3,948,863 A | 4/1976 | Akamatsu et al. | 260/78 A |
| 3,961,031 A | 6/1976 | Yasui et al. | 423/210 |
| 3,969,244 A | 7/1976 | Kobayashi et al. | 210/388 |
| 3,984,606 A | 10/1976 | Morgan | 428/419 |
| 3,994,719 A | 11/1976 | Corte et al. | 75/101 BE |
| 3,999,825 A | 12/1976 | Cannon | 339/15 |
| 4,008,937 A | 2/1977 | Filippi | 339/15 |
| 4,038,071 A | 7/1977 | Di Bella | 75/108 |
| 4,051,316 A | 9/1977 | Wing et al. | 536/107 |
| 4,053,401 A | 10/1977 | Fukushima et al. | 210/52 |
| 4,069,140 A | 1/1978 | Wunderlich | 208/251 H |
| 4,072,605 A | 2/1978 | Thelander | 210/50 |
| 4,083,783 A | 4/1978 | Wing et al. | 210/54 |
| 4,087,359 A | 5/1978 | Patron et al. | 210/50 |
| 4,094,777 A | 6/1978 | Sugier et al. | 210/32 |
| 4,101,631 A | 7/1978 | Ambrosini et al. | 423/210 |
| 4,108,769 A | 8/1978 | Krieg et al. | 210/50 |
| 4,118,243 A | 10/1978 | Sandesara | 106/109 |
| 4,133,755 A | 1/1979 | Tarao et al. | 210/38 B |
| 4,147,626 A | 4/1979 | Findlay et al. | 210/52 |
| 4,151,077 A | 4/1979 | Nogueira et al. | 210/21 |
| 4,153,556 A | 5/1979 | Riedinger | 210/218 |
| 4,160,730 A | 7/1979 | Nguyen | 210/48 |
| 4,196,173 A | 4/1980 | deJong et al. | 423/210 |
| 4,230,486 A | 10/1980 | Capuano et al. | 75/81 |

(Continued)

FOREIGN PATENT DOCUMENTS

CA        2173171        10/1996

(Continued)

OTHER PUBLICATIONS

"Appendix B: Arsenic and Clarifications to Compliance and New Source Contaminants Monitoring; Final Rule (66 FR 6976)"; *Environmental Protection Agency*; Aug. 2002; pp. 1-174.

(Continued)

*Primary Examiner*—Elizabeth D. Wood
(74) *Attorney, Agent, or Firm*—Sheridan Ross P.C.

(57) ABSTRACT

The present invention is directed to a sorbent comprising a disordered polyvalent metal oxide on the surface of an inert substrate. The substrate can be a layered silicate, such as vermiculite, an aluminosilicate such as montmorillonite, or a nonlayered silicate such as a zeolite. The sorbent removes ionic contaminants, such as arsenic, from process streams.

25 Claims, 11 Drawing Sheets

U.S. PATENT DOCUMENTS

| | | | |
|---|---|---|---|
| 4,233,274 A | 11/1980 | Allgulin | 423/210 |
| 4,238,329 A | 12/1980 | Zievers | 210/36 |
| 4,245,989 A | 1/1981 | Folkenroth et al. | 433/92 |
| 4,249,786 A | 2/1981 | Mahoff | 339/15 |
| 4,256,227 A | 3/1981 | Petrovich | 209/166 |
| 4,256,707 A | 3/1981 | Flynn, Jr. et al. | 423/42 |
| 4,260,494 A | 4/1981 | Dotson et al. | 210/721 |
| 4,273,747 A | 6/1981 | Rasmussen | 423/210 |
| 4,278,820 A * | 7/1981 | Kametaka et al. | 568/678 |
| 4,285,564 A | 8/1981 | Spinner | 339/89 C |
| 4,340,623 A | 7/1982 | Justus | 427/361 |
| 4,354,942 A | 10/1982 | Kaczur et al. | 210/712 |
| 4,363,749 A | 12/1982 | Weiss et al. | 252/455 R |
| 4,377,483 A | 3/1983 | Yamashita et al. | 210/670 |
| 4,385,891 A | 5/1983 | Ligotti | 433/92 |
| 4,410,751 A * | 10/1983 | Shin et al. | 585/640 |
| 4,419,107 A | 12/1983 | Roydhouse | 55/5 |
| 4,443,417 A | 4/1984 | Wiklund | 423/210 |
| 4,459,370 A | 7/1984 | van der Wal et al. | 502/338 |
| 4,474,896 A | 10/1984 | Chao | 502/216 |
| 4,500,327 A | 2/1985 | Nishino et al. | 55/72 |
| 4,564,374 A | 1/1986 | Hofmann | 55/57 |
| 4,583,999 A | 4/1986 | Lindahl et al. | 55/68 |
| 4,591,437 A | 5/1986 | Ernryd et al. | 210/265 |
| 4,599,177 A | 7/1986 | Hayashi et al. | 210/718 |
| 4,614,592 A | 9/1986 | Googin et al. | 210/679 |
| 4,654,322 A | 3/1987 | Holbein et al. | 502/403 |
| 4,670,160 A | 6/1987 | Moriya et al. | 210/728 |
| 4,693,731 A | 9/1987 | Tarakad et al. | 55/72 |
| 4,695,447 A | 9/1987 | Shultz | 423/659 |
| 4,709,118 A | 11/1987 | Yan | 585/820 |
| 4,721,582 A | 1/1988 | Nelson | 252/189 |
| 4,722,918 A * | 2/1988 | Schneider et al. | 502/81 |
| 4,731,187 A | 3/1988 | Moriya et al. | 210/728 |
| 4,740,488 A * | 4/1988 | Fogler et al. | 502/84 |
| 4,752,398 A | 6/1988 | Holbein et al. | 210/679 |
| 4,753,632 A | 6/1988 | Hofmann et al. | 494/43 |
| 4,753,909 A * | 6/1988 | Bousquet et al. | 502/84 |
| 4,764,219 A | 8/1988 | Yan | 134/2 |
| 4,764,355 A | 8/1988 | Romey et al. | 423/244 |
| 4,771,030 A | 9/1988 | Audeh | 502/414 |
| 4,774,213 A * | 9/1988 | Schneider et al. | 502/81 |
| 4,786,483 A | 11/1988 | Audeh | 423/210 |
| 4,786,484 A | 11/1988 | Nelson | 423/239 |
| 4,814,091 A | 3/1989 | Napier et al. | 210/665 |
| 4,814,152 A | 3/1989 | Yan | 423/210 |
| 4,834,953 A | 5/1989 | Audeh | 423/210 |
| 4,843,102 A | 6/1989 | Horton | 521/28 |
| 4,844,815 A | 7/1989 | Ader et al. | 210/751 |
| 4,861,493 A | 8/1989 | Jansen | 210/715 |
| 4,877,515 A | 10/1989 | Audeh | 208/251 R |
| 4,892,567 A | 1/1990 | Yan | 55/33 |
| 4,902,662 A | 2/1990 | Toulhoat et al. | 502/216 |
| 4,909,926 A | 3/1990 | Yan | 208/253 |
| 4,909,944 A | 3/1990 | Jackson et al. | 423/674 |
| 4,911,825 A | 3/1990 | Roussel et al. | 208/251 R |
| 4,915,818 A | 4/1990 | Yan | 208/251 |
| 4,917,862 A | 4/1990 | Kraw et al. | 423/4 |
| 4,919,826 A | 4/1990 | Alzner | 210/788 |
| 4,933,158 A | 6/1990 | Aritsuka et al. | 423/210 |
| 4,950,408 A | 8/1990 | Duisters et al. | 210/660 |
| 4,962,276 A | 10/1990 | Yan | 585/867 |
| 4,969,995 A | 11/1990 | Jackson et al. | 210/263 |
| 4,985,389 A | 1/1991 | Audeh | 502/516 |
| 4,986,898 A | 1/1991 | Torihata et al. | 208/251 |
| 5,017,135 A | 5/1991 | Meyer | 433/92 |
| 5,034,054 A | 7/1991 | Woodward | 75/388 |
| 5,053,209 A | 10/1991 | Yan | 423/210 |
| 5,062,948 A | 11/1991 | Kawazoe et al. | 208/251 |
| 5,064,626 A | 11/1991 | Johnson et al. | 423/245.1 |
| 5,080,799 A | 1/1992 | Yan | 210/661 |
| 5,085,844 A | 2/1992 | Nowack et al. | 423/245.1 |
| 5,107,060 A | 4/1992 | Yan | 585/823 |
| 5,114,578 A | 5/1992 | Sundström | 210/256 |
| 5,120,515 A | 6/1992 | Audeh et al. | 423/210 |
| 5,141,724 A | 8/1992 | Audeh et al. | 423/210 |
| 5,154,833 A | 10/1992 | Robinson | 210/664 |
| 5,173,286 A | 12/1992 | Audeh | 423/566.1 |
| 5,192,163 A | 3/1993 | Fleming | 405/128 |
| 5,202,301 A | 4/1993 | McNamara | 502/417 |
| 5,209,773 A | 5/1993 | Audeh et al. | 75/388 |
| 5,227,053 A | 7/1993 | Brym | 210/143 |
| 5,238,488 A | 8/1993 | Wilhelm | 75/742 |
| 5,245,106 A | 9/1993 | Cameron et al. | 585/823 |
| 5,248,488 A | 9/1993 | Yan | 423/210 |
| 5,256,615 A * | 10/1993 | Oomura et al. | 502/62 |
| 5,294,417 A | 3/1994 | Moore et al. | 423/101 |
| 5,298,168 A | 3/1994 | Guess | 210/713 |
| 5,304,693 A | 4/1994 | Boitiaux et al. | 585/648 |
| 5,308,500 A | 5/1994 | Schwarzbach | 210/716 |
| 5,322,628 A | 6/1994 | Yan | 210/673 |
| 5,330,658 A | 7/1994 | Grant et al. | 210/717 |
| 5,336,835 A | 8/1994 | McNamara | 585/820 |
| 5,338,444 A | 8/1994 | van Buren et al. | 210/660 |
| 5,357,002 A | 10/1994 | Lezzi et al. | 525/332.2 |
| 5,360,632 A | 11/1994 | Johnson et al. | 427/212 |
| 5,369,072 A | 11/1994 | Benjamin et al. | 502/84 |
| 5,370,827 A | 12/1994 | Grant et al. | 588/18 |
| 5,391,217 A | 2/1995 | Zoche | 75/724 |
| 5,409,522 A | 4/1995 | Durham et al. | 75/670 |
| 5,419,884 A | 5/1995 | Weekman et al. | 423/210 |
| 5,421,994 A | 6/1995 | Sarrazin et al. | 208/251 R |
| 5,435,980 A | 7/1995 | Felsvang et al. | |
| 5,437,797 A | 8/1995 | Helmig | 210/669 |
| 5,460,643 A | 10/1995 | Hasenpusch et al. | 95/134 |
| 5,463,167 A | 10/1995 | Ou | 585/823 |
| 5,492,627 A | 2/1996 | Hagen et al. | 210/651 |
| 5,523,067 A | 6/1996 | Markovs | 423/99 |
| 5,536,416 A | 7/1996 | Coltrinari et al. | 210/723 |
| 5,569,436 A | 10/1996 | Lerner | 422/170 |
| 5,577,910 A | 11/1996 | Holland | 433/92 |
| 5,599,515 A | 2/1997 | Misra et al. | 423/101 |
| 5,607,496 A | 3/1997 | Brooks | 75/670 |
| 5,610,113 A * | 3/1997 | Matsui et al. | 502/84 |
| 5,613,851 A | 3/1997 | Trawöger et al. | 433/92 |
| 5,658,487 A | 8/1997 | Carey et al. | 252/180 |
| 5,667,695 A | 9/1997 | Bedard et al. | 210/681 |
| 5,670,122 A | 9/1997 | Zamansky et al. | 423/210 |
| 5,679,259 A | 10/1997 | Bolser | 210/719 |
| 5,695,726 A | 12/1997 | Lerner | 423/210 |
| 5,741,397 A | 4/1998 | Kraver | 159/25.2 |
| 5,753,125 A | 5/1998 | Kreisler | 210/710 |
| 5,795,159 A | 8/1998 | Ralls et al. | 433/92 |
| 5,797,742 A | 8/1998 | Fraker | 433/92 |
| 5,846,434 A | 12/1998 | Seaman et al. | 210/724 |
| 5,880,060 A | 3/1999 | Blake et al. | 502/411 |
| 5,885,076 A | 3/1999 | Ralls et al. | 433/92 |
| 5,898,093 A | 4/1999 | Vos | 588/236 |
| 5,900,042 A | 5/1999 | Mendelsohn et al. | 75/742 |
| 5,907,037 A | 5/1999 | Gujral et al. | 536/59 |
| 5,908,559 A | 6/1999 | Kreisler | 210/710 |
| 5,919,001 A | 7/1999 | Lin | 405/128 |
| 5,922,277 A | 7/1999 | Donhoff et al. | 422/1 |
| 5,967,965 A | 10/1999 | Vyshkina et al. | 588/256 |
| 5,976,270 A | 11/1999 | Zelez et al. | 134/28 |
| 5,976,383 A | 11/1999 | Guess et al. | 210/711 |
| 5,986,161 A | 11/1999 | Akae et al. | 588/231 |
| 6,022,216 A | 2/2000 | Cattani | 433/92 |
| 6,024,239 A | 2/2000 | Turner et al. | 220/269 |
| 6,083,306 A | 7/2000 | Cattani | 96/157 |
| 6,083,473 A | 7/2000 | Esquivel et al. | 423/576.8 |
| 6,103,205 A | 8/2000 | Wojtowicz et al. | 423/210 |
| 6,132,623 A | 10/2000 | Nikolaidis et al. | 210/719 |
| 6,139,485 A | 10/2000 | Pal et al. | 588/256 |

| | | | |
|---|---|---|---|
| 6,139,751 A | 10/2000 | Bogaert et al. | 210/679 |
| 6,153,108 A | 11/2000 | Klock et al. | 210/722 |
| 6,165,366 A | 12/2000 | Sarangapani | 210/666 |
| 6,166,278 A * | 12/2000 | Engelhardt et al. | 585/259 |
| 6,214,304 B1 | 4/2001 | Rosenthal et al. | 423/210 |
| 6,270,679 B1 | 8/2001 | Kreisler | 210/710 |
| 6,274,045 B1 | 8/2001 | Kreisler | 210/710 |
| 6,284,208 B1 | 9/2001 | Thomassen | 423/210 |
| 6,294,139 B1 | 9/2001 | Vicard et al. | 423/210 |
| 6,322,613 B1 | 11/2001 | Wojtowicz et al. | 95/107 |
| 6,372,187 B1 | 4/2002 | Madden et al. | 422/171 |
| 6,375,909 B1 | 4/2002 | Dangtran et al. | 423/235 |
| 6,387,276 B1 | 5/2002 | Nikolaidis et al. | 210/719 |
| 6,403,044 B1 | 6/2002 | Litz et al. | 423/101 |
| 6,432,858 B1 * | 8/2002 | Tezuka | 502/22 |
| 6,447,740 B1 | 9/2002 | Caldwell et al. | 423/210 |
| 6,524,371 B2 | 2/2003 | El-Shoubary et al. | 95/134 |
| 6,533,842 B1 | 3/2003 | Maes et al. | 95/134 |
| 6,534,024 B2 | 3/2003 | Honjo et al. | 423/210 |
| 6,558,642 B2 | 5/2003 | El-Shoubary et al. | 423/245.3 |
| 6,638,347 B2 | 10/2003 | El-Shoubary et al. | |
| 6,734,131 B2 * | 5/2004 | Shih et al. | 502/80 |
| 2001/0007647 A1 | 7/2001 | Honjo et al. | 423/210 |
| 2003/0099585 A1 | 5/2003 | Allgulin | 423/210 |
| 2003/0161771 A1 | 8/2003 | Oehr | |
| 2004/0013589 A1 | 1/2004 | Vosteen et al. | |

FOREIGN PATENT DOCUMENTS

| | | |
|---|---|---|
| CA | 2173271 | 2/1999 |
| DE | 3813 264 A1 | 11/1988 |
| DE | 41 23907 A1 | 1/1993 |
| DE | 44 22 468 A1 | 1/1996 |
| JP | 48026672 A | 4/1973 |
| JP | 51069483 | 6/1976 |
| JP | 59-216631 * | 12/1984 |
| WO | WO 02/096559 A1 | 5/2001 |
| WO | WO 03/093518 | 11/2003 |

OTHER PUBLICATIONS

"Arsenic Drinking Water"; *The National Academies Press*; 1999; 5 pp.

"Arsenic In Bangladesh Ground Water: World's Greatest Arsenic Calamity"; *International Conference*, Wagner College, Spiro Hall; Staten Island, NY, USA; Feb. 27-28, 1999; 32 pgs.

"Arsenic in Drinking Water: Treatment Technologies for Arsenic Decision Tree, Variances and Exemptions"; *Environmental Protection Agency*; Jun. 2-3, 1999; pp. 1-9; website: http://www.epa.gov/cgi-bin/epaprintonly.cgi.

"Arsenic Toxicity"; *Agency for Toxic Substances and Disease Registry*; Oct. 2000; pp. 1-42.

"Arsenic Treatment Technologies for Soil, Waste, and Water"; *US Environmental Agency*; Sep. 2002; pp. i—16-4.

Balasubramanian et al.; "Arsenic Removal from Industrial Effluent through Electrocoagulation"; *Chem. Eng. Technol.*; 2001, vol. 24, No. 5; pp. 519-521.

Chwirka et al.; "Removing Arsenic from Groundwater"; *Journal AWWA—Executive Summary*; Mar. 2000, vol. 92, No. 3, 2 pp.; website: http://www.awwa.org/Communications/journal/Archives/i300es4.htm.

Davis; "Aqueous Silica in the Environment: Effects on Iron Hydroxide Surface Chemistry and Implications for Natural and Engineered Systems"; *Master's Thesis, Virginia Polytechnic Institute and State University*; May 9, 2000; pp. 1-30.

"Demonstration Project Summary: Arsenic Treatment Technology Demonstration"; *TAC, Montana University System Water Center*; Mar. 2001: 4 pp.

Davis; "Aqueous Silica in the Environment: Effects of Iron Hydroxide Surface Chemistry and Implications for Natural and Engineered Systems"; *Master's Thesis, Virginia Polytechnic Institute and State University*; May 9, 2000; pp. I-30.

Driehaus et al.; "Granular Ferric Hydroxide—A New Absorbent for the Removal of Arsenic from Natural Water"; *J. Water SRT—Aqua*; 1998vol. 47, No. 1; pp. 30-35.

"EPA Needs More Stringent Standard for Arsenic in Drinking Water"; *US Water News Online*; Apr. 1999; 3 pgs.; website: http://www.uswaternews.com/archives/arcquality/9epanee4.htm.

Fields et al.; "Arsenic Removal from Drinking Water by Coagulation/Filtration and Lime Softening Plants";*National Risk Management Research Laboratory*, US Environment Protection Agency in Cincinnati, OH; Jun. 2000; pp. i-96

"Future Water Needs in Colorado"; *Colorado State Demographer*; 1994; 1 pg.; website: http://waterknowledge.colostate.edu/future.htm.

Hering et al.; "Arsenic Removal by Ferric Chloride"; *Journal AWWA*; Apr. 1996; pp. 155-167.

Klura et al.; "Bactericidal Activity of Electrolyzed Acid Water from Solution Containing Sodium Chloride at Low Concentration, in Comparison with that at High Concentration"; *Journal of Microbiological Methods*; 2002, vol. 49, pp. 285-293.

Kraft et al.; "Electrochemical Water Disinfection Part I: Hypochlorite Production from Very Dilute Chloride Solutions"; *Journal of Applied Electrochemistry*; 1999; vol. 29, pp. 861-868.

Lepkowski; "Arsenic Crisis Spurs Scientists"; *C & EN*; May 17, 1999; pp. 45-49.

"List of Drinking Water Contaminants & MCLs"; *US Environmental Protective Agency*; (Last updated Mar. 18, 2004); pp. 1-12 and 1-6.

Mollah et al.; "Electrocoagulation (EC)—Science and Applications"; *Journal of Hazardous Materials*, B84; 2001, pp. 29-41.

Morita et al.; "Disinfection Potential of Electrolyzed Solutions Containing Sodium Chloride at Low Concentrations"; *J Viro Methods*; Mar. 2000; vol. 85(1-2); pp. 163-174.

Nolan; "National Statistical Analysis of Nutrient Concentrations in Ground Water"; *URL*: http://water.usgs.gov/nawga/nutrients/datasets/nutconc2000/; 4 pgs, no date.

"Proven Alternatives for Aboveground Treatment of Arsenic in Groundwater"; *US Environmental Protection Agency*; Oct. 2002; pp. 1-E-2.

"Public Health Statement for Arsenic"; *Agencry fo rToxic Substances and disease Registry*; Sep. 2000; 12 pgs.; website: http://www.atsdr.cdc.gov/ToxProfiles/phs8802.html.

Renk; "Treatment of Hazardous Wastewaters by Electrocoagulation"; *Colorado Hazardous Waste Management Society*; Nov. 6-7, 1989; 12 pgs.

Smith et al.; "Contamination of Drinking-Water by Arsenic in Bangladesh: A Public Health Emergency"; *World Health Organization*; 2000; pp. 1093-1103.

Welch et al.; "Arsenic in Ground-Water Resources of the United States"; *US Geological Survey*; May 2000; 4 pgs.

Woodwell et al.; "Water Efficiency for Your Home"; *Rocky Mountain Institute 3rd Edition*; 1995; pp. 1-18.

U.S. Appl. No. 10/134,178, filed Apr. 26, 2002, Lovell.

U.S. Appl. No. 09/794,557, filed Feb. 27, 2001, Albiston et al.

U.S. Appl. No. 09/997,932, filed Nov. 28, 2001, Broderick et al.

U.S. Appl. No. 10/253,944, filed Sep. 23, 2002, Broderick.

Jan. 20, 2003 print-out of E-watertechnologies' website at http://www.e-watertechnologies.com. regarding Whole House Anion Water Conditioner, 2 pages.

Jan. 20, 2003 print-out of E-watertechnologies' website at http://www.e-watertechnologies.com regarding Whole House Reverse Osmosis System, 4 pages.

Jan. 20, 2003 print-out of Wholly Water® website at http://www.wholly-water.com regarding The Ultimate Drinking Water Purification System, 9 pages.

Jan. 20, 2003 print-out of Prostar Mechanical Technologies Ltd. website at http://www.prostar-mechanical.com regarding Water Purification Systems and Equipment, 4 pages.

Jan. 20, 2003 print-out of A1 Ultra Pure Drinking Water's website at http://www.a1ultrapure.com/drink.html regarding Drinking Water Systems, 8 pages.

Jan. 21, 2003 print-out of Apyron Technologies' website at http://www.apyron.com/home.html beginning with home page and including The Complete Arsenic Treatment Solution, 15 pages.

Jan. 20, 2003 print-out of USFilter website at http://www.usfilter.covm/water regarding GFH™ Granular Ferric Hydroxide Media, 2 pages.

Jan. 20, 2003 print-out of Severn Trent Services at http://www.severntrentservices.com regarding SORB33, 2 pages.

Jan. 20, 2003 print-out of ADI website at http://www.adi.ca regarding Arsenic Removal, 1 page.

Jan. 20, 2003 print-out of TRAMFLOC, INC. website at http://www.tramfloc.com regarding Application of ActiGuard AAFS50 to Arsenic Removal, 3 pages.

Jan. 20, 2003 print-out of Waste Technologies of Australia Pty. Ltd. (Arsenic Solutions Information Page, Solutions and Resources) at http://www.arsenic-solutions.com regarding Simple Arsenic Removal Process (site under reconstruction), 2 pages.

Jan. 20, 2003 print-out of WRT website at http://wrtnet.com regarding The Z-33™ Arsenic Removal Process, 1 page.

Agion Antimicrobial, Agion Technologies L.L.C., The Most Advanced Antimicrobial Silver Delivery System, An Introduction, 10 page, no date.

Bayer Corporation, Plastics Division, "Wheel Covers, Center Caps Become Revolving Art Forms With New Film Insert Molding Technology," 4 pages, no date.

Brown, et a; "Mercury Measurement and Its Control: What We Know, Have Learned, and Need to Further Investigate;" J. Air & Water Manage. Assoc., pp. 1-97; Jun. 1999.

Gash, et al; "Efficient Recovery of Elemental Mercury from Hg(II)-Contaminated Aqueous Media Using a Redox-Recyclable Ion-Exchange Material;" Environ. Sci. Technol. 1988, 32, 1007-1012.

Dorhout and Strauss; "The Design, Synthesis, and Characterization of Redox-Recyclable Materials for Efficient Extraction of Heavy Element Ions form Aqueous Waste Streams;" 1999 American Chemical Society, pp. 53-68.

Rose, Arthur W., Hawkes, Herbert E., Webb, John S., "Geochemistry in Mineral Exploration," Second Edition, 1979, 3 pgs.

Maximum Separation Systems brochure, 7 pgs, no date.

Maximum Product Information brochure, printed Apr. 14, 2000 from website http://www.amalgamseparators.com, 3 pgs.

Apr. 14, 2000 printout of ISOSEP® found at website http://www.drs.nl, 2 pgs.

Maximum Separation Systems, Inc. Model 2000 Type 4 Amalgam Separator brochure, 1 pg, no date.

Metasys brochure, 2 pgs, no date.

ADA Technologies, Inc. Final Progress Report Entitled "Cleanup of Dental Amalgam Waste to Meet Sewer Discharge Regulations;" Grant No. 1 R43 ES07886-01, Apr. 28, 1997, 43 pgs.

Bindsley; "Dental Office Waste Stream Characterization Study;" Municipality of Metropolitan Seattle, Royal Dental College, Adv. Dent. Res. 6:125-130, Sep. 1991, 60 pgs.

Bill Johnson; Technical Memorandum on "Mercury Source Identification Update: Dental Offices and Human Waste;" EIP Associates; Mar. 2, 1999, 25 pgs.

"Scientific Review of Issues Impacting Dentistry;" Naval Dental Research Institute; vol. 2, No. 1, Jan. 2000, 5 pgs.

Pederson et al.; "The Removal of Mercury from Dental-Operatory Wastewater by Polymer Treatment;" Naval Dental Research Institute, Environmental Health Perspectives vol. 107, No. Jan. 1, 1999, 6 pgs.

Kümmerer et al.; "Mercury Emissions from Dental Chairs by Disinfection;" Institute of Environmental Medicine and Hospital Epidemiology, University Hospital Freiburg, *Chemosphere*, vol. 35, No. 4, pp. 827-833, 1997.

Fan et al.; "Environmental issues in dentistry—mercury*;" International Dental Journal (1997)47, 105-109. *Project Initiated and report approved by FDI Commission.

"Best Management Practices for Dental Waste;" City of Boulder Public Works/Utilities; 9 pgs, no date.

Batchu et al., "Comparison of Particle Size Distributions of Dental Wastewater Under Various Clinical Procedures;" Naval Dental Research Institute Great Lakes, Illinois, 19 pgs, no date.

Cailas et al., "Physico-chemical Properties of Dental Wastewater;" Waste Environmental Federation, Chicago, Illinois, Oct. 1994, 11 pgs.

Arenholt-Bindsley and Larsen; "Mercury Levels and Discharge in Waste Water from Dental Clinics;" Waste, Air and Soil Pollution; 86:93-99, Jan. 1996, 8 pgs.

Letzel et al.; "An Estimation of the Size Distribution of Amalgam Particles in Dental Treatment Waste;" J. Dent.Res. 76(3): 780-788; Mar. 1997.

Listing of Abstracts from Int'l Conference "Arsenic in Bangladesh Ground Water: World's Greatest Arsenic Calamity," Feb. 22-28, 1999, 22 pgs.

EPA "Arsenic in Drinking Water: Treatment Technologies for Arsenic Decision Tree, Variances and Exemptions," Jun. 2-3, 1999, 9 pages.

Driehaus, et al., "Granular ferric hydroxide—a new absorbent for the removal of arsenic from natural water," J. Water SRT—Aqua 47, 1998, abstract and pp. 59-68.

Murcott, Susan, Appropriate Remediation Technologies for Arsenic-Contaminated Wells, Massachusetts Institute of Technology, "Arsenic in Bangladesh Ground Water" Wagner College, Staten Island, New York, Feb. 27-28, 1999, 13 pgs.

ADA Technologies, Inc., "Turnkey Arsenic Removal for Small Water Systems," Topic #AF03-265, Proposal #F031-0720, 3 pgs, no date.

Stewart et al., "Stabilization of Radioactively Contaminated Elemental Mercury Wastes," DOE Spectrum 1998 Conference.

Sittig, 1973, Pollutant Removal Handbook: 286-294.

Grant et al., 1987, Grant & Hackh's Chemical Dictionary: 25, 29.

Barth, 1990, The SITE Demonstration of the CHEMFIX Solidification/Stabilization Process at the Portable Equipment Salvage Company Site: 166-170.

Huang et al., 1991, Emissions of Airborne Toxics from Coal-Fired Boilers: Mercury: 13-16.

Superfund Innovative Technology Evaluation, 1992.

Trezek, 1992, Remediation of Heavy Metals in Soils and Sludges: 1-5.

Darnell et al., 1992, Full-Scale Tests of Sulfur Polymer Cement and Non-radioactive Waste in Heated and Unheated Prototypical Containers: iii-A-8.

Blumbach et al., 1992, Sorbalit—A New Economic Approach Reducing Mercury and Dioxin Emissions: 2-20.

Hartenstein, 1992, A Fixed Bed Activated Coke/Carbon Filter as a Final Gas Cleaning Stage Retrofitted for a Hazardous Waste Incineration Plant—The First 6 Months of Operating Experience: 2-16.

Gorin et al., 1994, Final Disposal Options for Mercury/Uranium Mixed Wastes From the Oak Ridge Reservation: iii-21.

Daryl R., 1998, ADA Technologies, Inc. Memorandum.

1998, ADA Process for Stabilizing Radioactively Contaminated Elemental Mercury a Success, VIII (3): 1-4.

Brown, 2000, Stabilization of Mercury Containing Wastes.

2000, Soil Screening Guidance for Radionuclides: User's Guide: i-C-8.

Davis et al., Mercury Mixed Waste Treatment: 13-23, no date.

Darco FGD Activated Carbon for Removal of Mercury and Dioxin From Flue Gas: 1-5, no date.

Conley, Hg Working Group/Treatment Demonstrations [3PCK]: 1-4, no date.

Broderick et al., Mercury Control and Treatment Processes for Solid, Liquid and Gas Streams, no date.

Tyson, 1992, Treatability Study for the Amalgamation of a Radioactively Contaminated Elemental Mercury Waste at the Idaho National Engineering Laboratory.

Faulkner et al., Size Reduction: 132-162, no date.

Roberts, et al., "Stabilization of Radioactively Contaminated Elemental Mercury Wastes," Paper No. 36-6, WM '98, Tucson, Arizona, Mar. 1-5, 1998.

* cited by examiner

HIGH CAPACITY REGENERABLE SORBENT FOR REMOVING ARSENIC AND OTHER TOXIC IONS FROM DRINKING WATER

CROSS REFERENCE TO RELATED APPLICATIONS

The present application claims the benefits of U.S. Provisional Application, Ser. No. 60/390,707, filed Jun. 21, 2002, of the same title to Lovell et al., which is incorporated herein by this reference. The subject matter of the present application is related to the subject matter of U.S. patent application, Ser. No. 10/134,178, filed Apr. 26, 2002, which is incorporated herein by this reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. 1 R43 ES11885-01, awarded by NIH, and Contract No. 68-D-02-078, awarded by EPA.

FIELD OF THE INVENTION

The present invention is directed generally to contaminant removal from fluids and specifically to contaminant removal from aqueous solutions.

BACKGROUND OF THE INVENTION

In the United States, arsenic concentrations in ground water are sometimes too high for potable drinking water, particularly in the West and parts of the Midwest and Northeast. Data collected by the U.S. Geological Survey indicate at least 10 percent of wells had arsenic concentrations in excess of 10 ug/l, which may also be expressed as micrograms per liter or parts per billion (ppb.) Low levels of arsenic exposure can cause a number of adverse health effects, including decreased production of red and white blood cells, abnormal heart function, blood vessel damage, liver or kidney injury, and impaired nerve function. It has also been linked to skin cancer, bladder cancer, and lung cancer.

The major source of the arsenic contamination is from naturally-occurring subsurface minerals. In its geologic occurrence, arsenic is typically found at high levels in primary sulfide minerals, such as arsenopyrite, pyrite, pyrrhotite, orpiment, and realgar. It is also found in trace amounts in silicate minerals. Arsenic is typically found in groundwater as arsenite ($AsO_3^{3-}$) (in which arsenic is in the trivalent state) or arsenate ($AsO_4^{3-}$) (in which arsenic is in the pentavalent state) ions derived from the leaching of naturally occurring subsurface materials and to a lesser extent from anthropogenic contamination.

Based on a review of the new data, the National Research Council (NRC) committee recommended that the Environmental Protection Agency (EPA) lower its standards on the amount of arsenic allowed in drinking water as soon as possible. The committee found a combined cancer risk of one in 100 from drinking water with the currently allowed maximum level of arsenic. In mid-January, 2001, the EPA announced a tougher drinking water standard for arsenic. The new rule lowers the standard from 50 ppb to 10 ppb and is expected to affect 10 percent of the nation's community drinking water systems.

There are various techniques for removing arsenic and other contaminants from aqueous streams. These methods include ion exchange, adsorption using activated alumina, or flocculation using iron hydroxides.

Ion exchange has long been known to remove arsenic from drinking water. In the process, anionic species, such as arsenic, are exchanged onto a polystyrene resin at reactive sites. Strong-base anionic exchange resins will remove pentavalent arsenic but are generally not effective for the removal of trivalent arsenic because trivalent arsenic is normally present as nonionic arsenous acid. Sulfate ions may occupy exchange sites on the resin in preference to arsenic ions, which is particularly a problem for ground waters high in total dissolved solids (TDS). The regeneration of the ion exchange media will also likely generate a hazardous waste due to the high arsenic concentration.

Activated alumina is especially useful for treating water with very high TDS. However, the effectiveness of activated alumina is highly pH sensitive. The adsorption process involves surface complexation and exchange of hydroxide ions for contaminants. Like ion exchange, activated alumina absorbs only ionized forms of arsenic and thus any trivalent arsenic must be oxidized to pentavalent arsenic to be removed from water. The solution pH is more critical to arsenic removal by activated alumina adsorption than it is for other water treatment processes such as ion exchange and iron-hydroxide coagulation. At high pH, silicic acid dissociates to produce $H_3SiO_4^-$, which competes with arsenic species for sorption sites. Depending on feedwater pH, groundwater may require substantial amounts of acid to adjust the feedwater pH to below-neutral conditions for optimal efficiency.

The coagulation/filtration process relies on the coprecipitation or sorption of pentavalent arsenic onto freshly precipitated $Fe(OH)_3$ solids. Removal of arsenic by iron hydroxide precipitation depends on pH, with more arsenic being removed at a lower pH. Silica may interfere with arsenic removal by adsorbing on iron hydroxide at a high pH. Disposal of the arsenic-containing coagulation sludge may be a concern if the arsenic is leachable from the residuals and does not pass the Toxicity Characteristic Leaching Procedure (TCLP).

SUMMARY OF THE INVENTION

These and other needs are addressed by the various embodiments and configurations of the present invention. The present invention is generally directed to the use of polyvalent oxides on substrates to remove various contaminants from contaminated fluids.

In one embodiment, a sorbent particle is provided that includes:

(a) a substrate having an ion exchange capacity of about 50 mEq/100 g or higher and a plurality of ion exchange sites; and (b) a plurality of disordered polyvalent metal oxides located at the plurality of ion exchange sites. The metal oxides are preferably in the form of metal hydroxides.

The substrate preferably has an ion exchange capacity ranging from about 80 to about 150 mEq/100 g and more preferably is a silicate, such as a member of the clay group (e.g., vermiculite and montmorillonite) or the zeolite group.

The disordered polyvalent metal oxide is only partly crystallized. Typically, the polyvalent metal oxide is microcrystalline or poorly crystallized and comprises at least 5 wt. % water of hydration.

The polyvalent metal is preferably a nontoxic metal, such as zirconium, aluminum, lanthanum, titanium, manganese, tin, iron, zinc, tungsten, and mixtures thereof.

Polyvalent metal oxides can have markedly different capacities to scavenge contaminant ions, depending on the surface charge. The elemental selectivity is usually controlled by the pH at which sorption is occurring. For example, manganese oxides are electronegative in basic waters whereas those in neutral to acidic waters may be electropositive. Accordingly, different types of polyvalent metals having different pH ranges governing electronegative and electropositive behavior can be ion exchanged onto the same substrate to provide a more pH insensitive sorbent. Examples would be combining, on a common substrate, manganese hydroxides and iron oxides or alumina (aluminum oxide) and iron oxides.

In another embodiment, a process is provided for manufacturing the sorbent. The process includes the steps of:

(a) contacting a solution comprising dissolved polyvalent metal ions with a substrate having a plurality of ion exchange sites to form an ion exchanged substrate having polyvalent metal ions exchanged at the plurality of ion exchange sites; and (b) contacting the ion exchanged substrate with an oxygen-containing fluid to convert most, if not all, of the polyvalent metal ions exchanged at the plurality of ion exchange sites into metal oxides. Typically, the polyvalent metal ions are in the form of a salt in the solution and are present in a super-equilibric concentration to cause existing metal ions on the substrate to enter the salt solution. Because the polyvalent metal ions are ion exchanged for the existing metal ions, the polyvalent metal oxide is commonly discontinuously distributed over the substrate surface and are not in the form of a continuous coating or layer over the substrate surface.

The present invention can have a number of advantages compared to the conventional additives. For example, the sorbents can provide improved and cost effective control of arsenic and other toxic metal ions in fluids. The sorbents of the present invention can have capacities to sorb toxic ions that greatly exceed that of current sorbents, such as granular ferric hydroxide, at a much lower unit cost. This is believed to be due, at least in part, to the sorbent's ability to sorb ions by several different mechanisms. The increased capacity combined with an economically efficient method of deploying the polyvalent metal oxides and hydroxides can offer the prospect of much more cost effective methods of toxic metal control for any facility that may require such control including, without limitation, municipal water districts, small private suppliers, and point-of-use systems. The use of silicate-based substrates can prevent adverse effects on the quality or value of the treated fluid caused by introducing undesirable ions. The use of a silicate substrate, such as vermiculite, can provide a sorption bed that has a very large sorption area but creates a low hydrostatic back pressure. The sorbents can remove not only pentavalent arsenic but also trivalent arsenic without costly and time consuming pre-oxidation. They can operate effectively on fluids having high TDS, even in the presence of sulfate ions at concentrations of up to 1,000 ppm. They can be relatively pH-insensitive and can operate effectively within the pH range of groundwater without prior pH adjustment.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
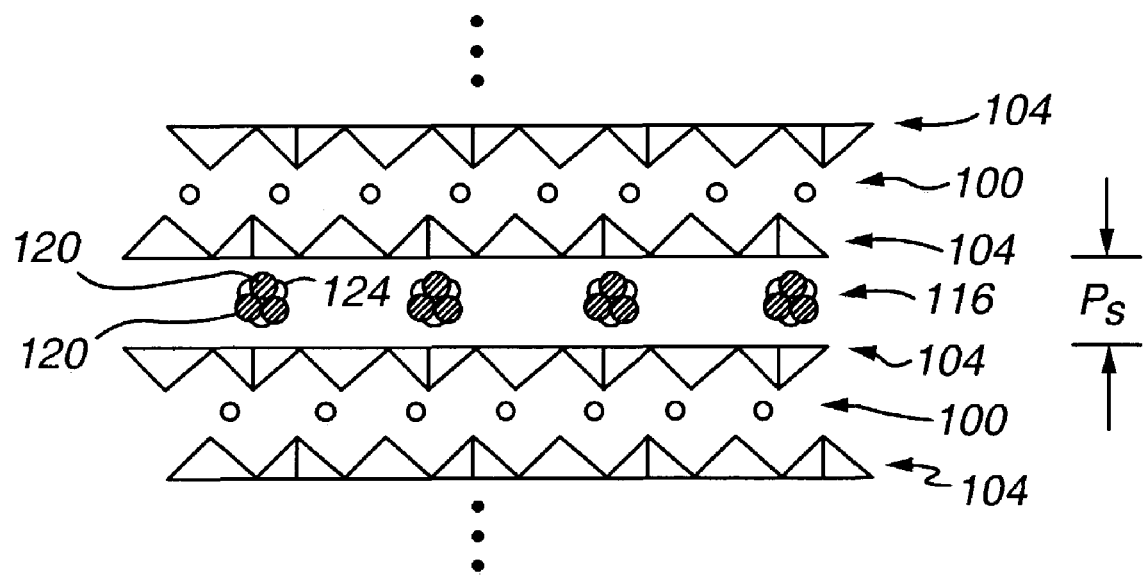
FIG. 1 is a cross-sectional view of adjacent plates of a substrate (not drawn to scale) according to an embodiment of the present invention.

The present invention uses a polyvalent metal oxide and/or hydroxide-containing sorbent to remove contaminants from fluids, particularly aqueous streams. As will be appreciated, the term "oxide" refers to a compound in which one or more metal atoms is bonded to one or more-oxygen atoms and therefore includes metal hydroxides. The sorbent includes a suitable substrate on which is deposited/substituted the polyvalent metal oxides and/or hydroxides by suitable techniques. Contaminants are believed to be collected on the sorbent by one or more mechanisms, namely co-precipitation, adsorption, surface complex formation, ion exchange, and penetration, (i.e., intercalation) of the crystal lattice formed by the polyvalent metal oxides and/or hydroxides. These mechanisms are individually and collectively referred to as "sorption" and are discussed more fully below.

The substrate can be any suitable substrate depending on the application. Preferably, the substrate is selected such that it is inert, does not introduce significant amounts of undesirable (toxic) contaminants, such as extraneous ions (other than hydroxyl and hydrogen ions), into the fluid being treated, has a high ion exchange capacity, and has a large surface area per volumetric or mass unit of material. Preferably, the ion exchange capacity is at least about 50 mEq/100 g and more preferably ranges from about 80 to about 150 mEq/100 g or more, and the surface area is at least about 100 $m^2/g$ and more preferably ranges from about 500 to about 800 $m^2/g$. Preferred substrates include a layered silicate material, such as a phyllosilicate, aluminosilicates such as montmorillonite, and non-layered silicates such as zeolites. Particularly preferred substrates include the clay minerals phyllosilicate (e.g., vermiculite) and montmorillonite. Clay minerals have a platelike or micaceous structure which provides a high surface area.

In phyllosilicate minerals, rings of tetrahedrons are linked by shared oxygens to other rings in a two dimensional plane that produces a sheet-like structure. Typically, the sheets are then connected to each other by layers of cations. These cation layers are weakly bonded and often have water molecules and other neutral atoms or molecules trapped between the sheets. The silicon to oxygen ratio is generally 1:2.5 (or 2:5) because only one oxygen is exclusively bonded to the silicon and the other three are half shared (1.5) to other silicons. The symmetry of the members of this group is controlled chiefly by the symmetry of the rings but is usually altered to a lower symmetry by other ions and other layers; but the overlying symmetry of the silicate sheets will usually still be expressed in a higher pseudo-symmetry. The typical crystal habit of phyllosilicates is flat, platy, book-like and most all members display good basal cleavage. Although members tend to be soft, they are remarkably resilient. Phyllosilicates are also generally tolerant of high pressures and temperatures.

Vermiculite (i.e., hydrated laminar magnesium-aluminum-ironsilicate that resembles mica in appearance) is one preferred sorbent substrate, given its high ion exchange capacity, commercial availability, and low cost. Vermiculite is the name applied to a group of magnesium aluminum iron silicate minerals, with a variable composition that may be summarized thus:

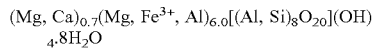

$(Mg, Ca)_{0.7}(Mg, Fe^{3+}, Al)_{6.0}[(Al, Si)_8O_{20}](OH)_4 \cdot 8H_2O$

Flakes of raw vermiculite concentrate are micaceous in appearance and contain interlayer water in their structure. When the flakes are heated rapidly, or treated with hydrogen peroxide, the flakes expand, or exfoliate, into accordion-like particles. The resulting lightweight material is chemically inert, fire resistant, and odorless. For these reasons vermiculite will not adversely affect the quality of water that is exposed to it.

Figure 4:
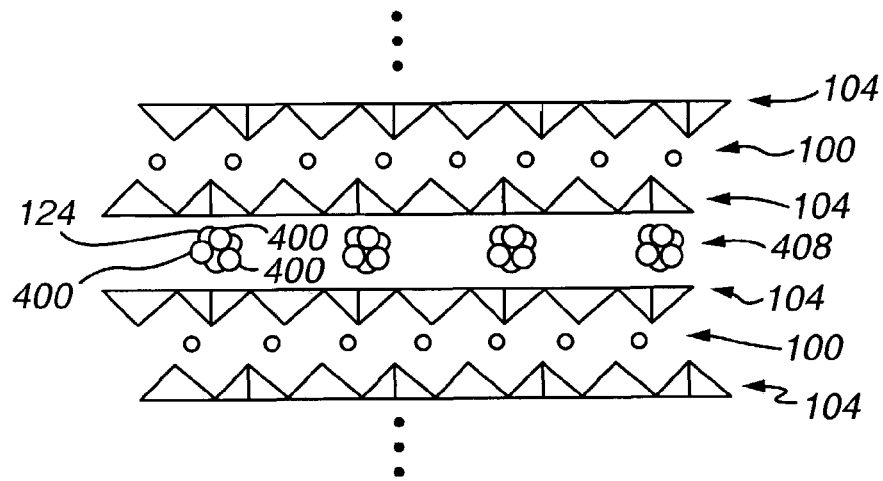
FIG. 4 is a prior art cross-sectional view of a naturally occurring substrate (not drawn to scale)

FIG. 4 depicts the platelet structure of vermiculite. Vermiculate is a phyllo-, or layered, silicate with a generalized structure similar to that of talc. It has a central, octahedrally coordinated interlayer of iron and magnesium oxides 100 lying between two inwardly pointing sheets 104 of silica tetrahedra. In vermiculite, iron and magnesium ions 100 substitute for silicon in the tetrahedral layer and the resulting electrical imbalance is neutralized by loosely bound interlayer 408 ions 400 of calcium, magnesium, or more rarely, sodium (or ion exchange sites). The interlayer space 408 also includes two ordered layers of water molecules 124 (depicted as being behind the ions 400). The calcium and magnesium ions within the interlayer space can be replaced by other metal ions, owing to vermiculites' very high ion-exchange capacity. Vermiculite is not described in the literature as an aluminosilicate.

Montmorillonite, also known as smectite, bentonite, or Fuller's Earth, is a clay weathering product of aluminosilicate minerals. These clays typically develop in semi-arid regions from solutions with high concentrations of magnesium ions and can be made synthetically. Montmorillonite is a crypto-crystalline alumino silicate. Montmorillonite clays are constructed of a single sheet of alumina octahedra, sandwiched between two layers of silica tetrahedra. Substitution of other atoms ($Mg^{2+}$, $Fe^{2+}$, or $Mn^{2+}$) for the aluminum in the octahedral layer or $Al^{3+}$ substitution for silicon in the tetrahedral layer leads to interlayer charge imbalance, producing one excess negative charge for each substituted atom. Cations, such as calcium ion and sodium ion, intercalate into the interlayer areas to balance the charge. Water molecules are also present in the interlayer areas.

The hydrated interlayer space between the sheets is expansible, that is, the separation between the individual smectite sheets varies depending upon the interlayer cations present. Because the interlayer area is hydrated, cations within the interlayer may easily exchange with cations in an external solution, providing that charge balance is maintained. This leads to very high cation exchange capacities in these materials that may be as high as 80–150 mEq/100 g. The availability of the interlayer areas and the very small particle size lead to these clays having extremely large effective surface areas.

Figure 2:
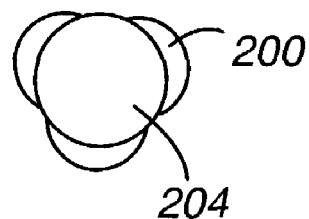
FIG. 2 is a cross-sectional view of a sorbent particle (not drawn to scale) according to an embodiment of the present invention.

Due to a low hydrological resistance when configured as a bed and a platy (high surface area) structure, vermiculite is generally the more preferred substrate. However, less porous/permeable materials, such as montmorillonite, can be used in a packed bed configuration if aggregated to larger size or adhered or cemented to a second suitable carrier substrate, such as sand. The type of substrate is depicted in FIG. 2. In FIG. 2, the sorbent material 200 is in a discontinuously (or continuously) distributed layer on the surface of a carrier substrate 204, such as a sand grain. The sorbent can be adhered to the carrier substrate 204 by known techniques and using a nontoxic adhesive, such as polyvinyl chloride or ethoxymethyl cellulose, that will not contaminate the effluent being treated. The smaller platelets can also be bound to each other using adhesive to form larger aggregates.

The polyvalent metal located on the sorbent can be any suitable polyvalent metal, including the transition metals. For treatment of drinking water, preferred non-toxic polyvalent metals include zirconium, aluminum, lanthanum, titanium, manganese, tin (both Sn(II) and Sn IV), iron (both ferric and ferrous iron), zinc, tungsten, and mixtures thereof. The polyvalent metals are stabilized on the substrate by being converted into oxides and/or hydroxides.

To provide for effective contaminant removal, the polyvalent metal oxides and hydroxides are disordered (or present as nonstoichiometric compounds), or only partially crystallized. Preferably, the polyvalent metal oxides and hydroxides are microcrystalline or poorly crystallized. The polyvalent metal oxides and hydroxides preferably have a water content (or water of hydration) of at least 5 wt. %.

While not wishing to be bound by any theory, FIG. 1 depicts, on a microscopic level, a configuration of the sorbent of the present invention. The sorbent 100 includes a number of spaced stacked sheets 104. Between adjacent pairs of plates is an inter-plate region 116 including polyvalent metal oxides/hydroxides 120 (or ion-exchange sites) and entrapped water molecules 124. The polyvalent metal oxides/hydroxides are discontinuously distributed in the inter-plate region 116 and are deposited as discussed below. The polyvalent metal oxides/hydroxides provide a sufficient inter-plate spacing ($P_s$ (FIG. 1)) for contaminants to pass through the inter-plate region and collect on the polyvalent metal compounds. In other words, it is believed that the polyvalent metal oxides/hydroxides "prop" open or maintain a desired inter-plate spacing distance.

The sorbent effectively collects various ionic contaminants from the surrounding fluid. Ionic contaminants include anions, including the anionic compounds comprising arsenic (both in the trivalent and pentavalent state), plutonium, phosphorous, molybdenum, and selenium and hydroxides and oxides thereof and cations including copper, lead, cadmium, uranium (in the form of uranyl ion), zinc, plutonium, phosphorus, molybdenum, and mercury.

Figure 7:
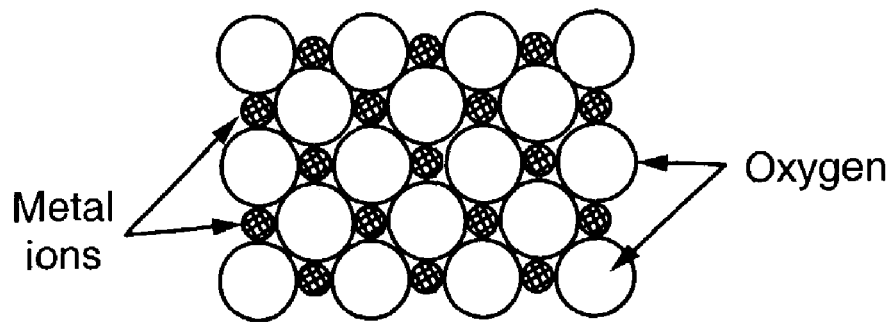
FIG. 7 depicts a step in the process of adsorption (not drawn to scale)
Figure 8:
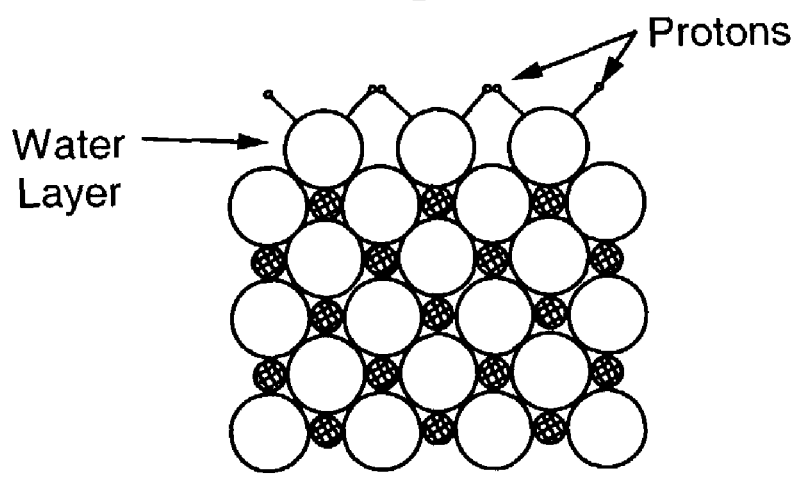
FIG. 8 depicts a step in the process of adsorption (not drawn to scale)
Figure 9:
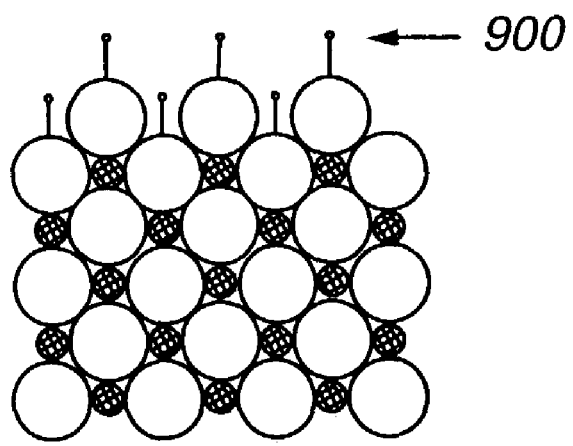
FIG. 9 depicts a further step in the process of adsorption (not drawn to scale)

While not wishing to be bound by any theory, the contaminants, as noted above, are believed to be removed by one or more mechanisms, depending on the contaminate. For example, co-precipitation occurs when a contaminant forms a compound with a distinct chemical composition from ions in solution and the polyvalent metal amendment. The amount of contaminant that can be removed is stoichiometrically based on the amount of polyvalent metal on the sorbent. By way of illustration, the molybdate ion ($MoO_4^{2-}$) will form ferrimolybdate ($Fe_2O_3 \cdot 3MoO_3 \cdot 8H_2O$) with iron in the polyvalent metal complex (FeO(OH)). The process is independent of the concentration of the molybdate ions in solution. Adsorption occurs when a contaminant is held to the surface of the sorbent by physical bonds. The metal ions at the surface of an oxide have a reduced coordination number, thus they behave as Lewis acids. The surface matrix of metal and oxygen ions is shown in FIG. 7. In the presence of water, the surface ions first coordinate water molecules as shown in FIG. 8. The water molecules undergo dissociative chemisorption to form a protonated surface as shown in FIG. 9. The hydroxyl ions and protons 900 at the surface of the oxide are available for bonding or exchange with ions in solution. The ligand exchange (e.g., with arsenic) is characterized by the equation:

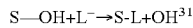

where "S" equals the oxide surface. Surface complex formation is characterized by sorption followed by bidentate complex formation. The equation characterizing sorption is as follows:

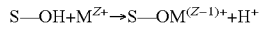

where M represents the polyvalent metal and Z the valent state of the metal. Bidentate complex formation is characterized by the following equation:

Bidentate complex

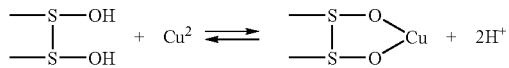

Compared to co-precipitation, surface complex formation is not limited by stoichiometry in the amount of contaminant that can be removed. Ion exchange involves the exchange of ions between a solid and a solution. By way of example, ion exchange can be characterized by the equation:

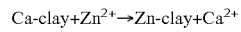

Figure 10:
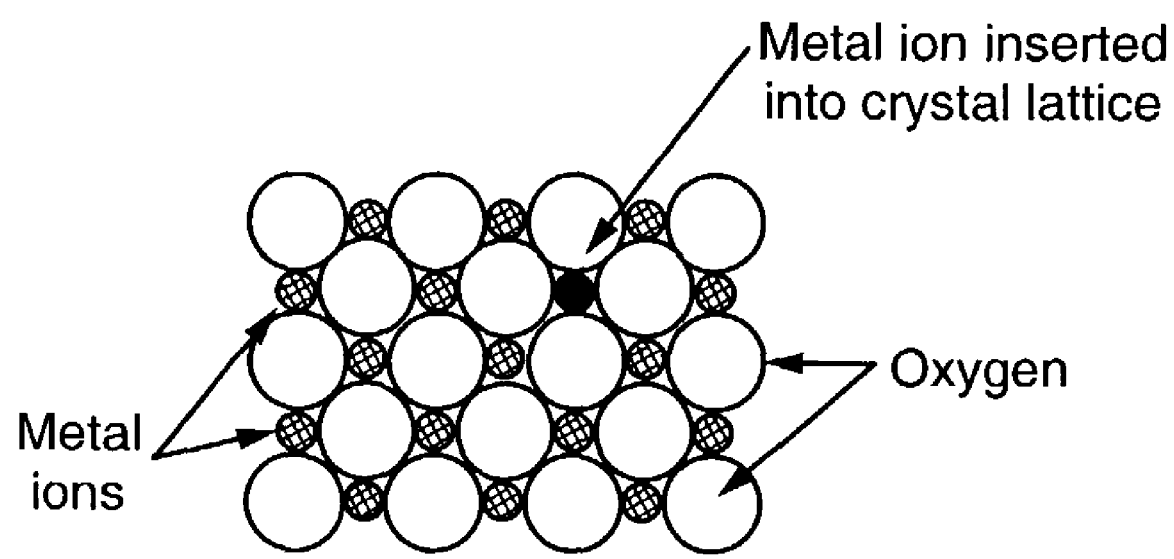
FIG. 10 depicts contaminant removal by penetration of the crystal lattice.

Using the sorbent of the present invention, ion exchange typically occurs by the contaminant replacing the oxygen, hydroxyl, and/or hydrogen ions in the polyvalent metal oxides/hydroxides. Finally, penetration of the crystal lattice refers to the insertion of metal ions into the crystal lattice structure of the polyvalent metal oxides/hydroxides by occlusion. This mechanism is depicted by FIG. 10.

The process to form the sorbent of the present invention will now be described with reference to FIGS. 3–5. Although any suitable technique for forming the sorbent may be employed, a preferred process chemically deposits and/or substitutes the disordered polyvalent oxides/hydroxides onto or into the substrate. For economic efficiency, the oxides and hydroxides are deposited onto the substrate in such a manner as to ensure maximal exposure of the oxide or the hydroxide to the ions in the fluid while substantially minimizing the amount of the more expensive amendment required.

Figure 3:
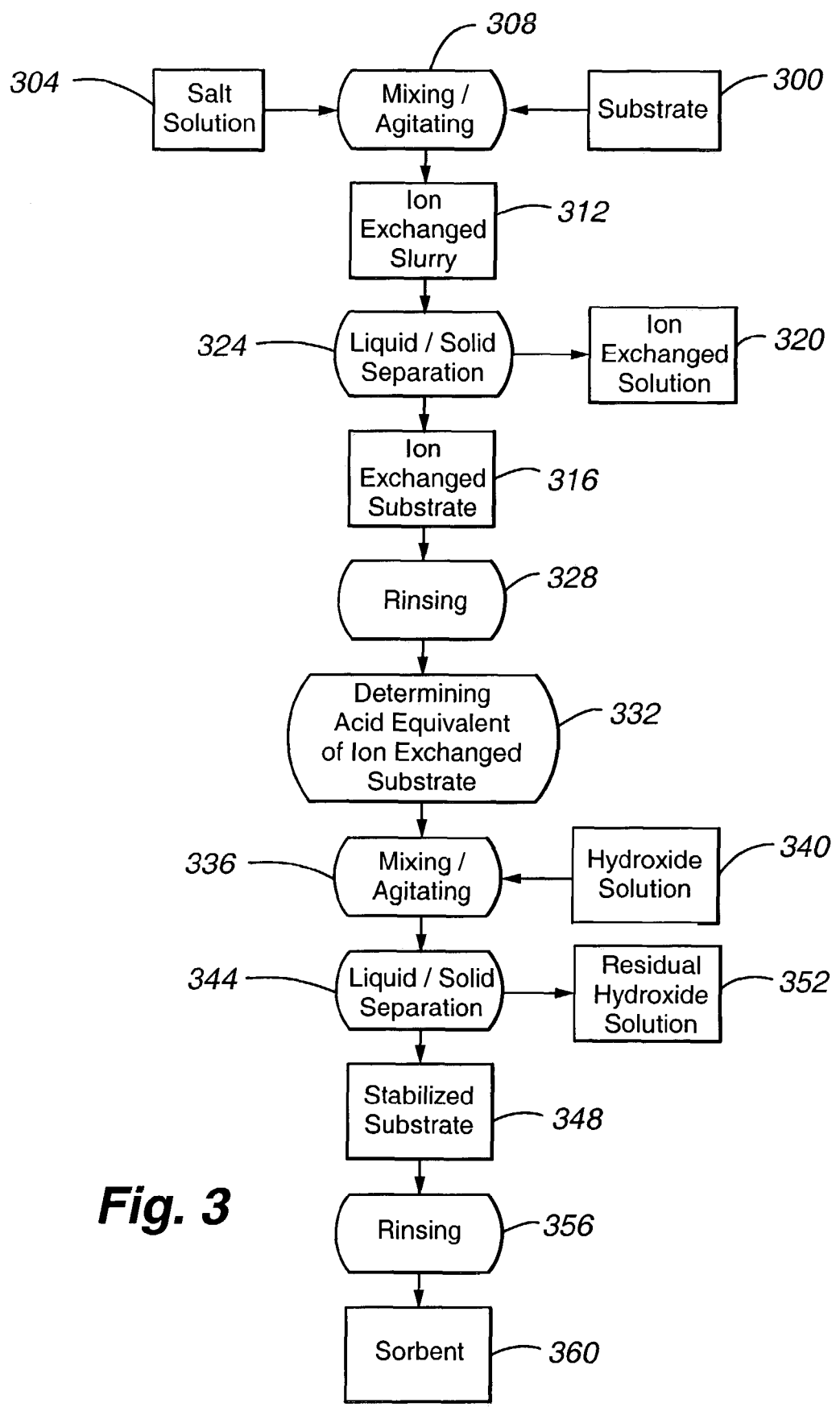
FIG. 3 depicts the steps of a sorbent manufacturing process according to an embodiment of the present invention.
Figure 5:
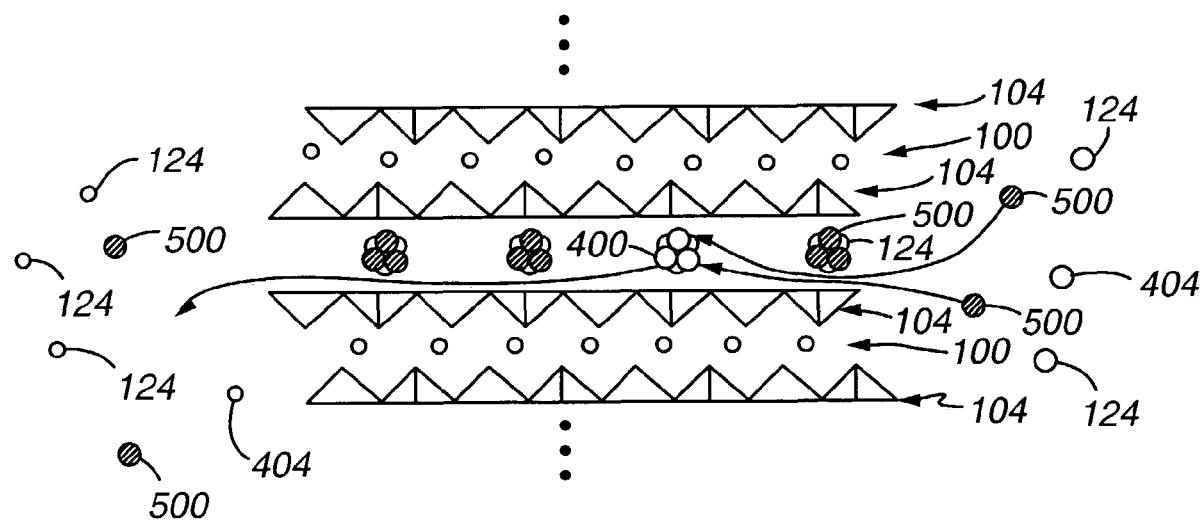
FIG. 5 is a cross-sectional view of ion exchange occurring on a substrate (not drawn to scale)

Referring now to FIGS. 3 and 5, the substrate 300 is combined with a salt solution 304 and mixed and agitated in step 308 for a time sufficient to replace the existing metal cations 404 in the native substrate with desired polyvalent metal cations 500. The polyvalent metal is typically in the form of a sulfate, nitrate, or chloride or as other soluble forms in the salt solution 304. The concentration of the dissolved polyvalent metal-containing ions/compounds is super-equilibric relative to the concentration of the metal cations 404 in the salt solution. In this manner, the metal cations 404 are driven into solution and the polyvalent metal cations 500 out of solution (to replace the metal cations 404) in an attempt to attain an equilibrium concentration of the metal cations 404 and polyvalent metal cations 500 in the salt solution 304. To realize substantially complete ion replacement of the native metal cations 404, the pH of the surrounding salt solution 304 is maintained at a level necessary to realize a substantially complete replacement of the native metal cations 404. Preferably the pH is maintained at a level below 2 and preferably from about pH 1 to about pH 2. The duration of the mixing and agitating step 308 typically ranges from about 2 to about 8 hours. Typically, at least about 90% of the native metal cations 404 are replaced by polyvalent metal cations 500.

The resultant ion exchanged slurry 312 (which includes the ion exchanged substrates 316 and the ion exchanged solution 320) are subjected in step 324 to liquid/solid separation, such as by pressure filtration, screening, settling, flotation, or centrifuging, to separate the ion from the exchanged solution 320 and the ion exchanged substrate 316. The recovered ion exchanged substrate 316 is rinsed in step 328 to remove the excess ion exchanged solution 320.

In step 332, the acid equivalent of the ion exchanged substrates 316 is determined by known techniques. As will be appreciated, the acid equivalent rating of the ion exchanged substrates 316 is indicative of the ion exchange activity (or polyvalent metal concentration) of the substrates. In one configuration, a small aliquot of the ion exchanged substrate 316 is titrated to neutrality with a base, such as sodium hydroxide solution. When the acid equivalent level is unsatisfactory, the ion exchanged substrates 316 are returned to step 308 for further ion exchange to be realized.

If the acid equivalent level is satisfactory, the ion exchanged substrates, in step 336, are contacted with a source of hydroxyl ions to yield the hydroxide solution 340 and subjected to further mixing/agitating for a sufficient period of time for at least most, and typically about 100%, of the polyvalent metal cations 500 on the substrates to be converted into oxides/hydroxides. The hydroxide solution 340 typically contains a superstoichiometric amount of hydroxyl ions relative to the amount of polyvalent metal ions identified by the acid equivalent level and has a pH ranging from about pH 7 to about pH 8. Typically, the hydroxide solution 340 contains at least about 9 g/l and more typically from about 18 to about 50 g/l of hydroxyl ion. A precipitate of the polyvalent metal hydroxide typically forms immediately from the excess polyvalent ions that enter into the solution from the substrate surface. Metal ions that have been exchanged into the lattice of the substrate also react to form the hydroxide and become immobilized in place within the substrate such that, during fluid treatment, the metal ions do not enter solution. Other alkali solutions beside the hydroxide solution may be employed. The sorbent of FIG. 1 results from this step when vermiculite is the substrate.

As will be appreciated, steps 308 and 332 or 332 and 336 can be performed simultaneously. With respect to the former combination of steps, samples of the ion exchanged substrate are removed and titrated to determine acid equivalent levels and step 308 continued until the desired acid equivalent level attained. With respect to the latter combination of steps, samples of the ion exchanged substrate are removed and titrated to determine acid equivalent levels and hydroxide solution added in step 336 until the desired acid equivalent level is attained.

In step 344, the stabilized substrate 348 is separated from the residual hydroxide solution 352 by liquid/solid separation techniques, such as those set forth above in connection with step 324. The stabilized substrate 348 is rinsed in step 356 to remove excess precipitate and bring the pH to neutrality.

The final product or sorbent 360 can be substantially different in color compared to the original substrate. For vermiculite as the substrate, the color is commonly substantially different but the vermiculite retains the luster of the original (native) material. This indicates that the polyvalent metal oxides/hydroxides have been introduced into the structure of the vermiculite rather than being merely a surface coating.

Surprisingly, though the sorbent effectiveness depends upon the ready availability of exchangeable protons and hydroxyl ions on the surface of the sorbent, the sorbent need not be maintained in a wetted state to prevent the loss of waters of hydration.

This preparation process is suitable for polyvalent metals with soluble acid salts of the appropriate valence state. However for certain metals, such as manganese in the plus four valence state, soluble metal salts do not exist or are unstable in solution. The above process is therefore modified to produce a suitable sorbent based on such metals. In the case of manganese, step 308 is carried out using an acid salt of manganese in the plus two valence state such as manganese(II) sulfate or chloride. After the hydroxide has been precipitated in step 336, the stabilized substrate 348 is exposed to an oxidant in a gas or liquid, such as a stream of moist air, to effectively oxidize the manganese to a higher valence state (e.g., the pentavalent state for manganese to form the disordered oxide/hydroxides (MnO(OH) and MnO(OH)$_2$).

The particle size of the sorbent can be important in optimizing contaminant removal. The average particle size of the sorbent particles 360 is larger than about 60 mesh. A preferable range is from about 30 mesh to about 5 mesh.

Figure 6:
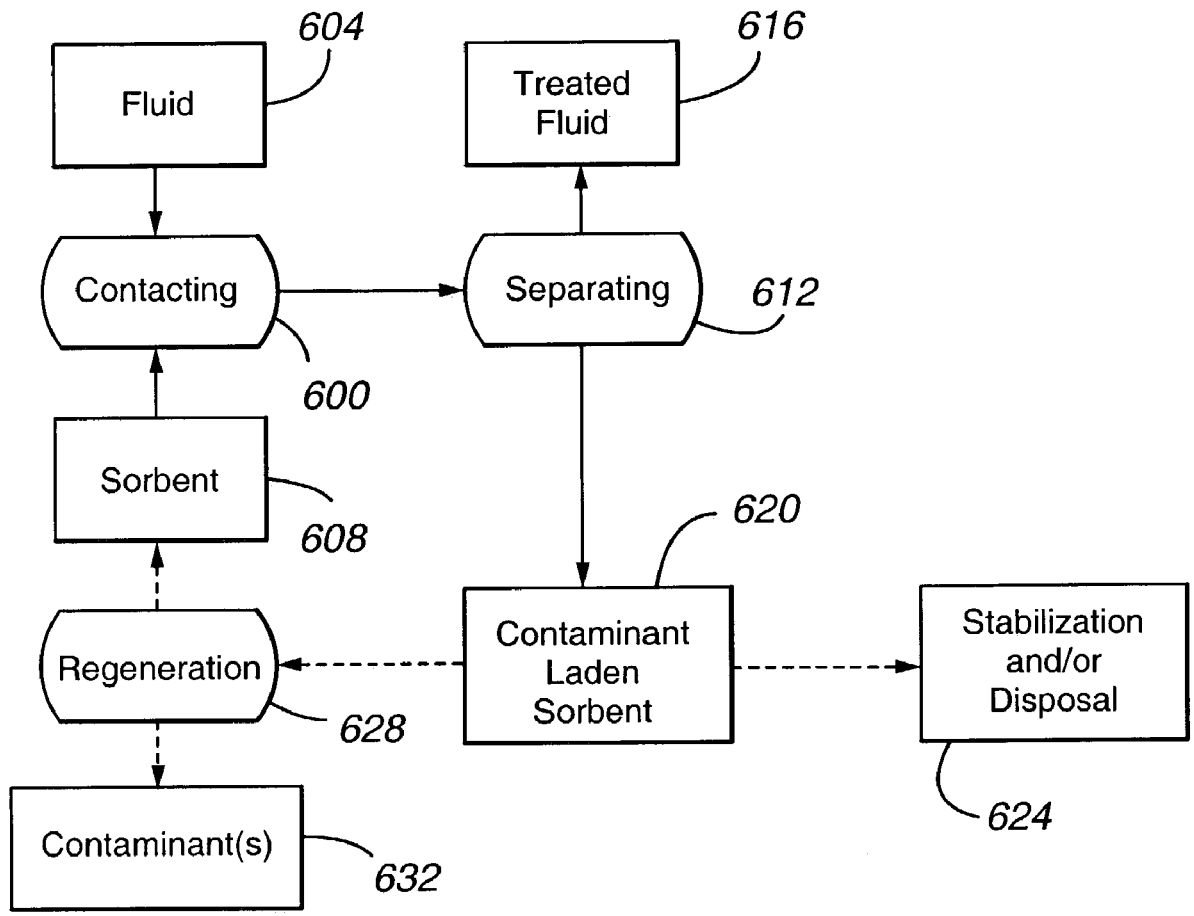
FIG. 6 depicts a process for treating a fluid according to an embodiment of the present invention.

Referring now to FIG. 6, the process for treating a fluid, such as water, is described. In step 600, the fluid 604 (which typically is a liquid having a pH ranging from about pH 5 to about pH 9) is contacted with the sorbent 608 in any suitable manner. Preferably, the fluid is passed through a fluidized or fixed bed of the sorbent particles. In step 612, the treated fluid 616 is separated from the contaminant laden sorbent 620 (or removed from the bed). The residence time of the fluid 604 in the contacting step 600 is typically at least a few tens of seconds, with at least about 120 seconds being preferred. After fluid treatment, the sorbent particles 620 eventually become laden with the contaminant so as to be less effective in contaminant removal. The contaminant laden sorbent 620 can be stabilized in step 624 by known techniques, if needed, and disposed of Alternatively, the sorbent can be regenerated in step 628 chemically or thermally by known techniques to remove the contaminants 632 and reused to treat further fluid.

The amount of contaminant(s) removed from the fluid can be high. Preferably, at least about +90% of the contaminants are removed to provide a final contaminant concentration of no more than about 10 ppb. Loadings of up to 0.75% arsenic by weight of the amended vermiculite and up to about 9.9 wt. % of the amended vermiculite have been realized. The capacity of the sorbents to adsorb arsenic appears to be unaffected by an excess of sulfate ions when present in concentrations up to about 1,000 ppm.

EXAMPLE 1

This Example describes preparation of sorbents of the present invention using various concentrations of ferric chloride and sodium hydroxide. These sorbents were then compared to a commercially available arsenic sorbent in an isotherm experiment to determine arsenic binding capacity.

All steps in all Examples (unless otherwise noted) were carried out at room temperature. Using the conditions/substrates/reactants noted in Table 1 below, 20 g each of vermiculites Palabora #4 (obtainable from Palabora, Inc. Palabora, South Africa), Carolina #5 and Virginia #4 (obtained from Virginia Vermiculite Ltd, Louisa, Va.) were weighed out and sieved to remove fines and placed in a beaker. All other reagents are obtainable from Sigma Chemical, St. Louis, Mo.) except as noted. To the dry sieved vermiculite, 200 milliliters (mL) of either a 10% or 20% (w/v) aqueous solution of ferric chloride was added. The reaction was then shaken at approximately 50 rpm overnight. At the end of 2 hours, 500 mL of a 10% or 20% w/v solution of NaOH was added and the reaction was incubated for overnight. Excess liquid was poured off and the sorbent was rinsed with tap water until the rinse water was at neutral pH. Sorbents were then dried at 60° C. overnight. Samples of these sorbents were observed under a microscope (at 32×, (obtainable from VWR Scientific, West Chester, Pa.) to assess for the presence of delamination; no delamination was noted.

TABLE 1

Formulation conditions for Formulations 1–8.

| Formulation Number | Substrate vermiculate source | Reagent 1 | Reagent 2 | dried? |
|---|---|---|---|---|
| AS1 | VA-vermiculite #4 | 10% FeCl$_3$ | 10% NaOH | yes |
| AS2 | VA-vermiculite #4 | 20% FeCl$_3$ | 20% NaOH | yes |
| AS2-W | VA-vermiculite #4 | 20% FeCl$_3$ | 20% NaOH | no |
| AS3 (also called UCC-CC-X001) | Carolina vermiculite #5 | 20% FeCl$_3$ | 20% NaOH | yes |
| AS4 | Carolina vermiculite #5 | 20% FeCl$_3$ | 20% NaOH | no |
| AS5 | Palabora #5 | 20% FeCl$_3$ | 20% NaOH | yes |
| AS5-W | Palabora #5 | 20% FeCl$_3$ | 20% NaOH | no |

The isotherm tests described herein determine the sorbent capacity (mg Arsenic/g sorbent) as a function of the equilibrium concentration of As. A "standard groundwater solution" was made using 100 ppm NaHCO$_3$ and 60 ppm CaSO$_4$ in distilled deionized water. Stock As(III) was prepared from As$_2$O$_3$ and stock As(V) was prepared from As$_2$O$_5$ by methods known in the art. Equal amounts of As(III) and As(V) was added to the standard groundwater solution to achieve the desired As starting concentrations of 0.5, 1, 5, 10, and 50 ppm. After addition of As, the pH was adjusted to the appropriate pH value using HCl or NaOH as necessary.

To determine the isotherm profile, 1 g dry-basis sorbent of the appropriate formulation or a control sorbent (commercially available arsenic sorbent based on granulated ferric hydroxide, GFH™ (available from US Filter, Warrendale, Pa.) was added to 100 mL. As solution at the appropriate concentration and placed on shaker table overnight to allow the mixture to reach equilibrium. After overnight incubation, the vermiculite was filtered with a 10 micron filter (available from VWR Scientific) and the supernatant saved. The filtrate was further filtered through a 0.45 micron filter. The filtrate and the supernatant were then analyzed for total As using an atomic absorption analyzer (AAnalyst 100, obtained from Perkin Elmer, Wellesley, Mass.) measuring arsine gas generation using standard methods known in the art.

Figure 11:
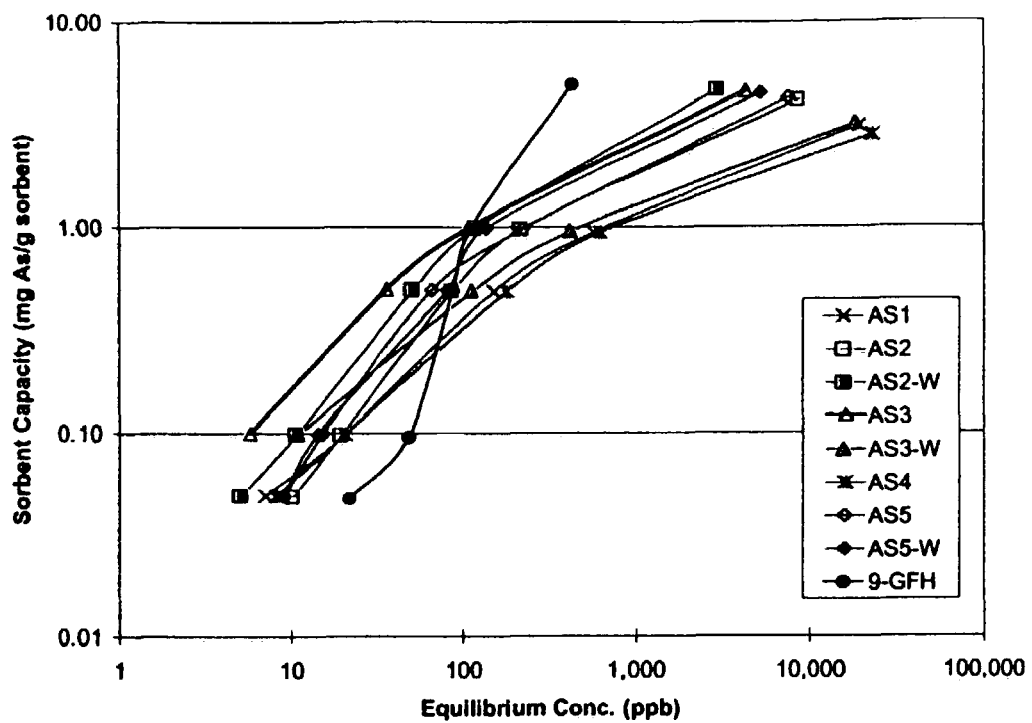
FIG. 11 depicts the isothermic performance of various formulations of sorbents of the present invention compared to a commercially available sorbent, GFH™.

The results are shown in FIG. 11. FIG. 11 shows the isotherm performance of various formulations of sorbents of the present invention compared to a commercially available sorbent, GFH™. The data indicate that all the sorbent formulations tested in this Example perform equally well, compared to a commercially available arsenic sorbent, to capture arsenic from water.

EXAMPLE 2

This Example describes preparation of sorbents of the present invention with high concentrations of ferric chloride (either 80% or 40% w/v ferric chloride) and with either a 2 hour or overnight incubation time. These sorbents were then compared to commercially available arsenic sorbents and a sorbent of the present invention prepared using lower ferric chloride as a control in an isotherm experiment to determine arsenic binding capacity.

Twenty grams each of vermiculite Virginia #4 (obtained from Virginia Vermiculite, Ltd) were placed in four beakers in the same manner as Example 1. To two of the beakers, 200 mL of an 80% ferric chloride aqueous solution was added. One of the 80% ferric chloride treated vermiculate beakers was allowed to incubate for 2 hours, and the other overnight. To the other two beakers, 200 mL of a 40% ferric chloride aqueous solution was added, and one of the 40% ferric chloride treated vermiculite beakers was allowed to incubate for 2 hours, and the other overnight. After the designated reaction time, 500 mL of a 20% aqueous solution of NaOH was added to all beakers. In both of the 2 hour ferric chloride treatment beakers, the NaOH treatment was allowed to proceed for 2 hours. In both of the overnight ferric chloride treatment beakers, the NaOH treatment was allowed to proceed overnight. After the NaOH treatment, excess liquid was poured off of all beakers and the sorbent was rinsed with tap water until the rinse water was at neutral pH. Sorbents were then dried at 60° C. overnight. Samples of these sorbents were observed under a microscope to assess for the presence delamination; delaminated sorbents are unacceptable. No delamination was noted.

Commercially available sorbents used were granulated ferric hydroxide GFH™ (available from US Filter, Warrendale, Pa.) and AD33L™ (available from AdEdge Technologies, Atlanta, Ga.).

The isotherm tests described herein determine the sorbent capacity (mg Arsenic/g sorbent) as a function of the equilibrium concentration of As. The isotherm was carried out in water containing 130 ppm NaHCO$_3$, 25 ppm CaCl$_2$, 13 ppm Na$_2$SO$_4$ at pH 8, and the profile was generated using the procedures described in Example 1.

TABLE 2

Preparation of sorbents of the present invention used in generating isotherm data in FIG. A.

| Formulation, code | Vermiculite, source | Ferric chloride Reagent | Sodium hydroxide reagent | Incubation time |
|---|---|---|---|---|
| | Palabora, Coarse | 80% | 20% | 2 hour |
| | Carolina #3 | 80% | 20% | 2 hour |
| UV4-80/20/24 | Virginia #4 | 80% | 20% | overnight |
| UV4-40/20/24 | Virginia #4 | 40% | 20% | overnight |
| UV4-80/20/2 | Virginia #4 | 80% | 20% | 2 hour |
| UV4-40/20/2 | Virginia #4 | 40% | 20% | 2 hour |
| UC-CC-XOO1 | Carolina #5 | 20% | 20% | 2 hours |

Figure 12:
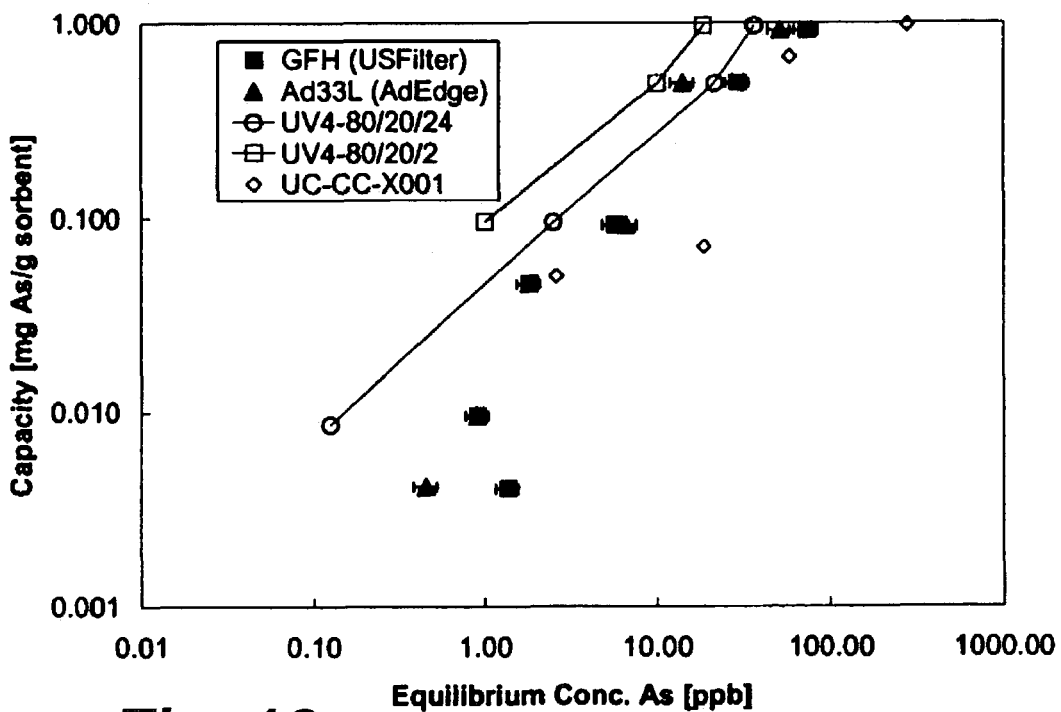
FIG. 12 depicts the isothermic performance of sorbent formulations of the present invention designed to increase the active iron-hydroxide content.

The results are shown in FIG. 12. FIG. 12 shows the isotherm performance of formulations designed to increase the active iron-hydroxide content of a sorbent of the present invention. The data shown indicate that, at each concentration of arsenic(As), greater amounts of As per g sorbent are adsorbed onto the sorbents UV4-80/20/24 and UV4-80/20/2 than sorbent UC-CC-XOO1 or commercially available sorbents GFH™ or AD33L™. Accordingly, UV4-80/20/24 and UV4-80/20/2 have higher arsenic capacities than any of UC-CC-XOO1 or commercially available sorbents GFH™ or AD33L™.

EXAMPLE 3

This Example compares the As adsorption capacity of a sorbent of the present invention and a commercially available arsenic adsorbent at pH 7.0.

Sorbent UC-CC-X001 and GFH™ were prepared as described in Example 1. Isotherm experiments were carried out as described in Example 1 according to the matrix in Table 3, below.

TABLE 3

Isotherm test matrix per pH per sorbent

| Sorbent Formulation | pH | As(III)/As(V) | Starting total As concentrations (ppm) |
|---|---|---|---|
| UC-CC-X001 | 7 | 50/50 | 50 |
| UC-CC-X001 | 7 | 50/50 | 10 |
| UC-CC-X001 | 7 | 50/50 | 5 |
| UC-CC-X001 | 7 | 50/50 | 1 |
| UC-CC-X001 | 7 | 50/50 | 0.5 |
| GFH ™ | 7 | 50/50 | 50 |
| GFH ™ | 7 | 50/50 | 10 |
| GFH ™ | 7 | 50/50 | 5 |
| GFH ™ | 7 | 50/50 | 1 |
| GFH ™ | 7 | 50/50 | 0.5 |

Figures 13, 14:
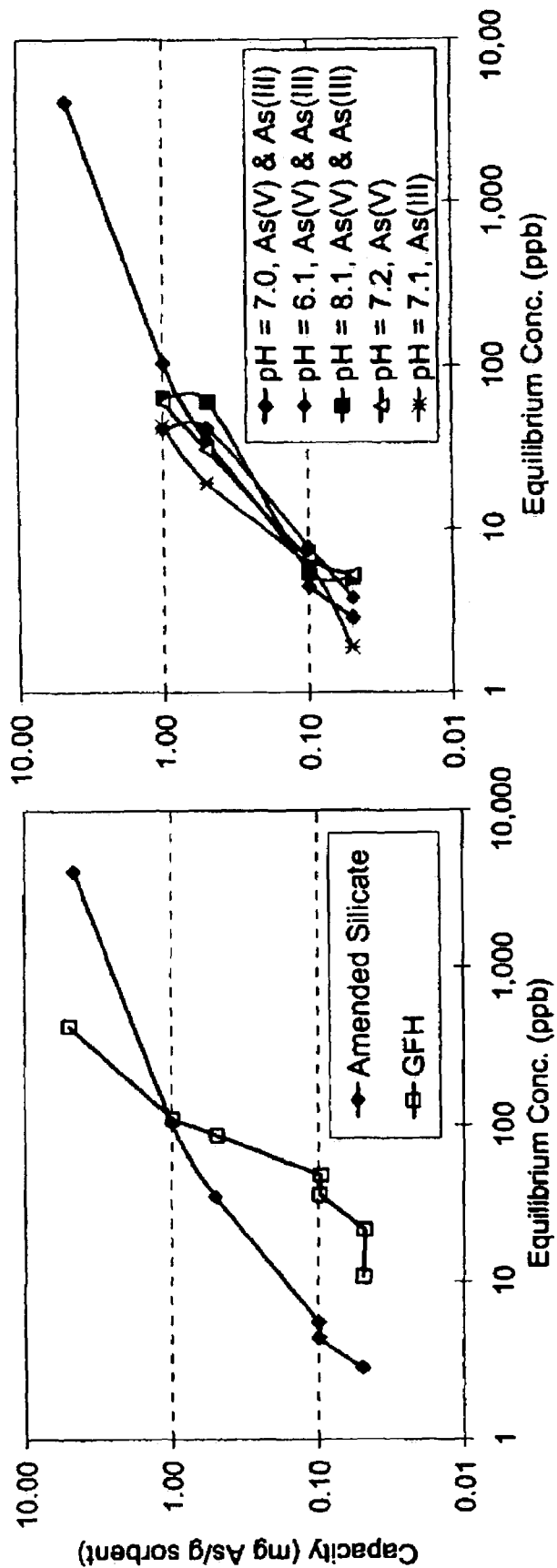
FIG. 13 depicts the isothermic performance of one embodiment of a sorbent of the present invention compared to a commercially, available sorbent, GFH™.
FIG. 14 depicts the isothermic performance of one embodiment of a sorbent of the present invention as a function of pH and form of arsenic.

Results are shown in FIG. 13. FIG. 13 is an isotherm graph comparing sorbent capacity in mg As/g sorbent as a function of the equilibrium concentration of As for both a sorbent of the present invention and a commercially available arsenic sorbent, GFH™. The results show that both are effective at removing As from water, and the performance of a sorbent of the present invention is comparable to the performance of GFH™. The data further shows that at concentrations of As in water of 100 ppb or less, sorbents of the present invention are more effective than GFH™ at adsorbing As, i.e., adsorbing more As per unit of sorbent. This effect appears to reverse at concentrations of As in water of higher than 100 ppb.

EXAMPLE 4

This Example demonstrates the ability of a sorbent of the present invention to capture arsenite and arsenate from water under a range of pH conditions.

Sorbent UC-CC-X001 and was prepared as described in Example 1. Isotherm tests were conducted as described in Example 1 using conditions shown in Table 4, below.

TABLE 4

Isotherm test matrix

| Sorbent Formulation | pH | As(III)/As(V) | Starting total As concentrations (ppm) |
|---|---|---|---|
| UC-CC-X001 | 6.1 | 50/50 | 10, 5, 1, 0.5 |
| UC-CC-X001 | 7 | 50/50 | 10, 5, 1, 0.5 |
| UC-CC-X001 | 8.1 | 50/50 | 10, 5, 1, 0.5 |
| UC-CC-X001 | 7.1 | 0/100 | 10, 5, 1, 0.5 |
| UC-CC-X001 | 7.2 | 100/0 | 10, 5, 1, 0.5 |

Results are shown in FIG. 14. FIG. 14 is an isotherm graph comparing sorbent capacity in mg As/g sorbent as a function of the equilibrium concentration of As comparing performance of sorbent formulation UC-CC-X001 as a function of pH and form of arsenic. The performance of UCC-CC-X001, a sorbent of the present invention, showed virtually no change as pH or arsenic form were changed. The ability of a sorbent of the present invention to capture arsenite or arsenate over a range of pH conditions is shown by this data.

EXAMPLE 5

In this Example, the addition of wetting agents or a degassing step were included in the ferric chloride reaction step to generate sorbents of the present invention.

The reaction conditions were as specified below in Table 5. Briefly, 10 g of Palabora Coarse vermiculite was placed into each of 9 beakers. To the beakers, 200 mL of either a 20%, 10%, or 5% solution of ferric chloride was added. To three of beakers, no further treatment was used. To three ofthe beakers, the beakers were degassed with a vacuum pump (available from Cole Parmer, Vernon Hills, Ill.) to approximately 15 inches Hg and stirred under vacuum. To three of the beakers, 0.2 mL of wetting agent BYK™-348 (obtained from BYK-Chemie, Germany) was added. After an overnight incubation, sorbents were treated with NaOH and rinsed as described in Example 1. Isothermic data were generated as described in Example 1.

TABLE 5

Isotherm test matrix; each reaction condition was tested with 0.5, 1, 5, 10 and 50 ppm As.

| Number | Substrate Vermiculite | Reagent 1 | Additional treatment |
|---|---|---|---|
| 1 | Palabora Coarse | 20% $FeCl_3$ | none |
| 2 | Palabora Coarse | 10% $FeCl_3$ | none |
| 3 | Palabora Coarse | 5% $FeCl_3$ | none |
| 4 | Palabora Coarse | 20% $FeCl_3$ | degas-stir under vacuum |
| 5 | Palabora Coarse | 10% $FeCl_3$ | degas-stir under vacuum |
| 6 | Palabora Coarse | 5% $FeCl_3$ | degas-stir under vacuum |
| 7 | Palabora Coarse | 20% $FeCl_3$ | add wetting agent |
| 8 | Palabora Coarse | 10% $FeCl_3$ | add wetting agent |
| 9 | Palabora Coarse | 5% $FeCl_3$ | add wetting agent |

Figure 15:
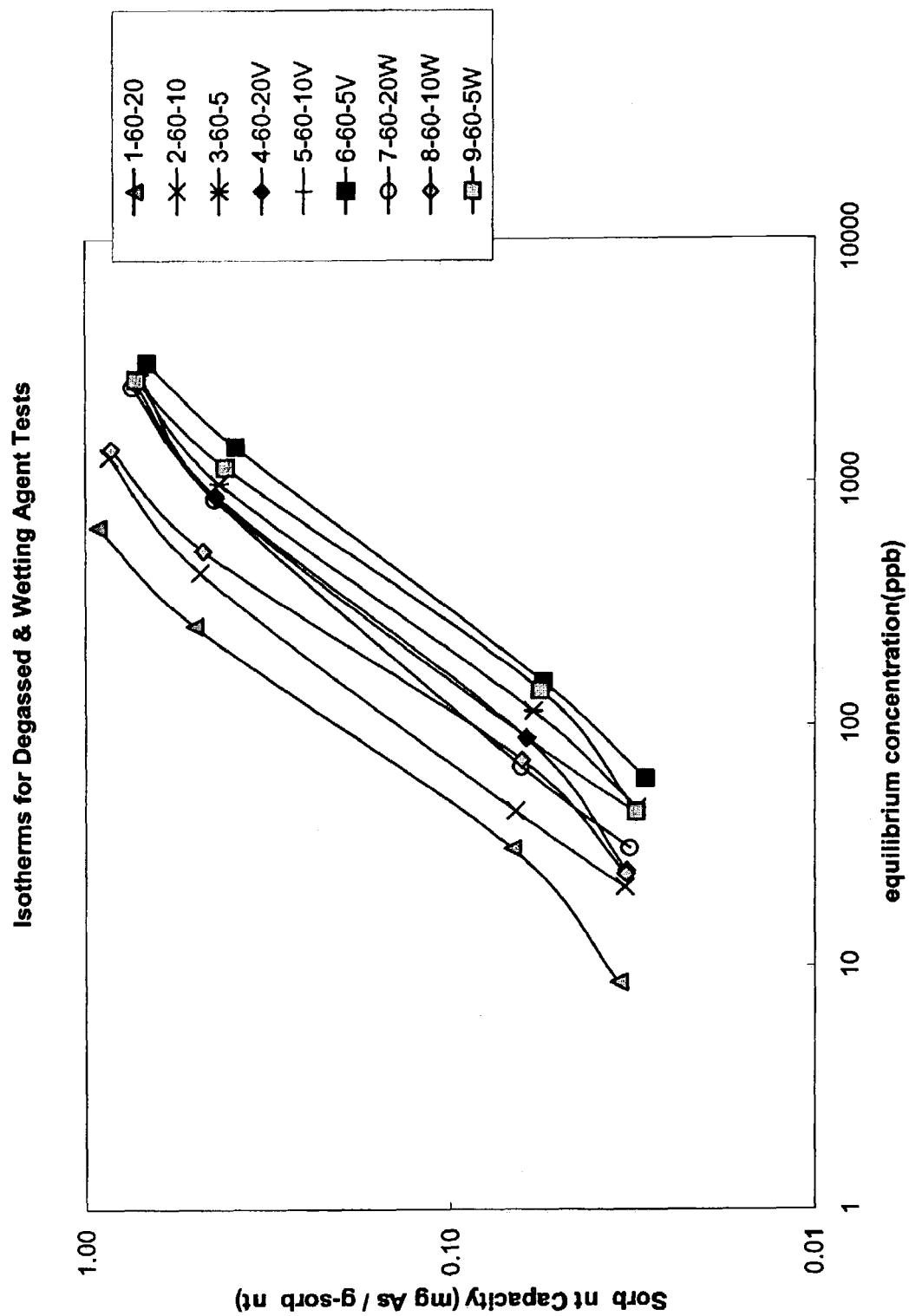
FIG. 15 depicts the isothermic performance of sorbents of the present invention treated with a wetting agent or iron-amended under vacuum compared to a control.

The results of this Example are shown in FIG. 15. FIG. 15 depicts the isothermic performance of sorbents of the present invention treated with a wetting agent or iron-amended under vacuum, compared to a control sorbent. FIG. 15 indicates that the addition of a wetting agent during the ferric chloride treatment or degassing the mixture during treatment with ferric chloride yields a sorbent with As adsorbent capacities approximately equal to the control.

EXAMPLE 6

In this Example, sorbents of the present invention are prepared using the substrate bentonite. The bentonite was either iron-amended before aggregation or iron-amended after aggregation. Isotherm data was then prepared using these sorbents.

1. Amended/aggregated bentonite. The following steps were performed in order.
   A) iron amendment step: 200 g −200 mesh bentonite (from the Colony mine, Wyoming, obtained from American Colloid Company, Arlington Heights, Ill.) was weighed out. 300 mL of an 80% w/v ferric chloride solution was added and the mixture was shaken at approximately 50 rpm for 2 hours. 750 mL of a 20% NaOH solution was added and the mixture shaken at approximately 50 rpm for 2 hours. Excess liquid was added and the treated bentonite was rinsed with tap water until the rinse water is at neutral pH. Treated bentonite was then dried at 60° C.
   B) aggregation step: Weigh out 200 g of 35# sieved sand (obtained from a Home Depot, Inc. retail store, Littleton, Colo.) and add 70 g of adhesive (medium weight blue PVC cement, obtained from a Home Depot, Inc. retail store, Littleton, Colo.). The mixture was stirred thoroughly with a spatula until the sand was evenly coated. Treated bentonite from step (A) above, was ground to −200 mesh size and was added slowly to the mixture, and mixed with a large mixer (obtained from VWR Scientific) until the mixture appears free-flowing. The mixture is then dried in an oven at 100° C. To determine the amount of bentonite that did not adhere to the sand, sieve the aggregated mixture with a 35# sieve and weigh the amount of bentonite lost from the sieve. This sorbent is called col 80-20-2 on sand.

2. Aggregated/amended bentonite. Steps (A) and (B) were performed as above, with the exception that the steps were performed in reverse order. For the iron amendment step, the aggregated bentonite was sieved with a 35# filter before the iron treatment step and for the rinse step instead of a 325# filter. This sorbent is called col on sand 80-20-2.

Figure 16:
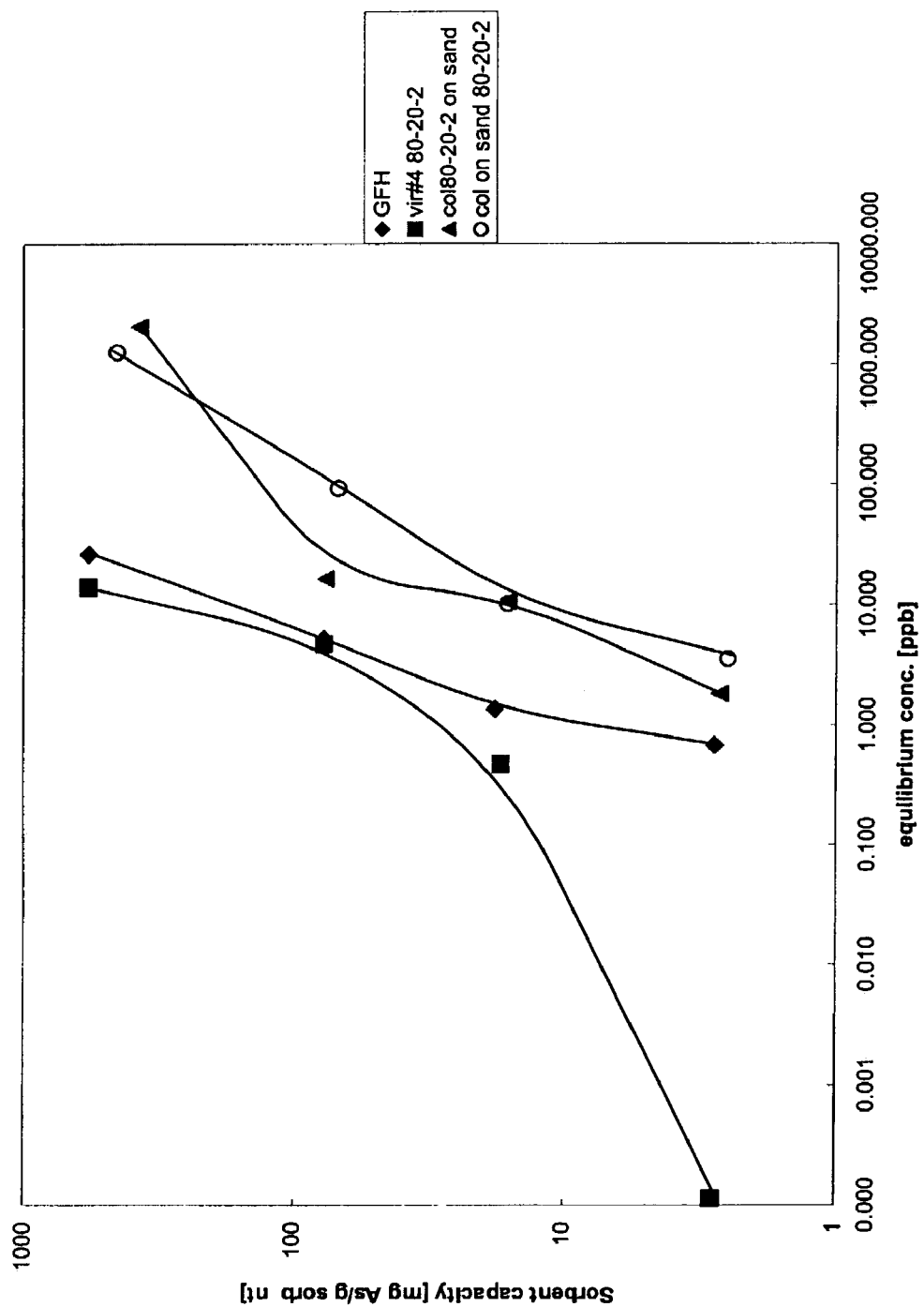
FIG. 16 depicts isothermic performance of sorbents of the present invention prepared from bentonite as the substrate compared to sorbents of the present invention prepared from vermiculite as a substrate and GFH™.

Sorbent UV4-80/20/2 (called vir#4 80-20-2) and GFH™ were prepared as described in Example 2. Isotherm experiments were carried out as described in Example 1. Results are shown in FIG. 16. FIG. 16 depicts the isothermic performance of sorbents of the present invention prepared from bentonite as the substrate compared to sorbents of the present invention prepared from vermiculite as the substrate and to GFH™. FIG. 16 indicates that both bentonite substrate sorbents of the present invention are effective at removing arsenic from water, although the arsenic binding capacity appears to be reduced as compared to the vermiculite substrate sorbent UV4-80/20/2 (called vir#4 80-20-2) and GFH™.

EXAMPLE 7

This Example describes the use of a sorbent of the present invention versus GFH in a column format to mimic actual use conditions and shows As concentrations in the feed stream and the outlet stream of the column.

Test columns were assembled as follows. UV4-80/20/2 sorbent (described in Example 2) was loaded into 2 inch internal diameter polycarbonate columns (obtained from VWR Scientific) to a bed depth of 7.5 inches. GFH columns were made from 1 inch diameter clear PVC pipe (obtained from Timberline Plastic Co., Denver, Colo.) with a bed depth of 30 inches. These dimensions were designed to follow the GFH guidelines of 5 minute empty bed contact time and 5-gpm/ft$^2$ hydraulic loading. The sorbent volumes were approximately equal in both cases. Flow through the column was maintained at 125 mL/min by the use of dual head peristaltic pumps (obtained from Anko Products, Bradenton, Fla.) Arsenic challenge water had the following recipe: $NaHCO_3$, 252 ppm; $CaCl_2$, 111 ppm; $Mg_2SO_4$, 62.6 ppm; $Na_2SiO_3.9H_2O$, 20 ppm as $SiO_2$; NaF, 1 ppm as fluoride; $NaNO_3$, 2 ppm as nitrite; $PO_4$, 0.04 ppm as phosphate; pH 8.5, containing 50 to 100 ppb As (as As(V)).

Total arsenic was tested using a Hach 2800000 Arsenic Test Kit (available from Hach, Inc., Loveland, Colo.) and later verified with samples sent to ACME Analytical Laboratories (Vancouver, BC). Analysis at ACME included full elemental analysis via ICP-MS.

Figure 17:
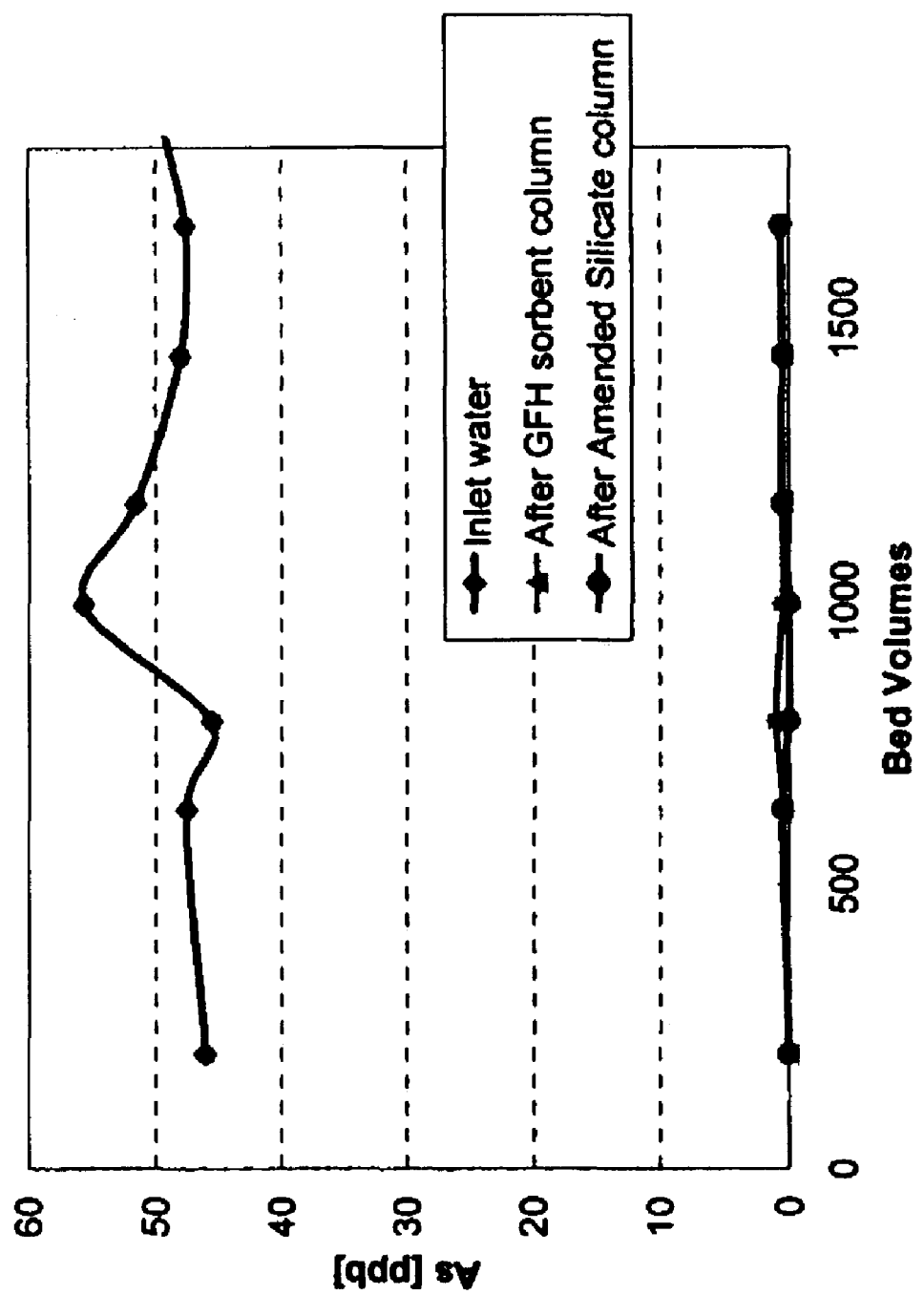
FIG. 17 depicts inlet and outflow arsenic concentration in water passed through a GFH™ sorbent column and a column containing a sorbent of the present invention.

The results of this Example are shown in FIG. 17. FIG. 17 shows the performance of the GFH sorbent column and sorbent UV4-80/20/2 in removing arsenic from inlet water at various bed volumes of water. Both types of material reduced the arsenic concentration to the 1 ppb detection limit, demonstrating the efficacy of a sorbent of the present invention when used in a column filtration format.

EXAMPLE 8

This Example illustrates the total iron bound to sorbents of the present invention after their preparation.

Iron content was determined by the Phenanthroline method, see Standard Methods for the Examination of Water and Wastewater, 20th ed., 1998, published by American Public Health Association, pp 3–76. Data is reported in Table 6, below. Percent iron is calculated by determining gram iron per gram sorbent.

TABLE 6

Percent Iron in each sorbent formulation (amount Fe per g sorbent)

| Sorbent formulation | Described in Example | % Fe |
|---|---|---|
| col 80-20-2 on sand | 6 | 14.5 |
| col on sand 80-20-2 | 6 | 4.8 |
| Col on sand, no Fe amendment | 6 | 0.3 |
| Col 80-20-2, no aggregation | 6 | 17.7 |
| UV4-80/20/2 | 2 | 30.4 |
| UV4-40/20/2 | 2 | 27.5 |
| UV4-80/20/24 | 2 | 32.1 |
| UV4-40/20/24 | 2 | 24.4 |
| GFH ™ | 2 | 37.4 |

A number of variations and modifications of the invention can be used. It would be possible to provide for some features of the invention without providing others.

For example in one alternative embodiment, the sorbent is used in the underliners of bodies of water, such as ponds, lakes, and reservoirs. In this configuration, a low permeability/porosity to restrict water flow is desirable. Thus, the sorbent is montmorillonite or a combination thereof and is blended in with unamended montmorillonite. Typically, the amount of sorbent in the liner ranges from about 1 to about 10 wt. % and more typically from about 2 to about 5 wt. % of the liner. The presence of sorbent dispersed in the liner along with the unamended substrate can remove contaminants in water seepage and thereby prevent contamination of the underground water table.

In another alternative embodiment, the sorbent is used to treat stationary bodies of water. The sorbent, which can be on montmorillonite (without a carrier substrate) is dispersed in the body of water and allowed to settle on the bottom of the body of water.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streaming the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A sorbent particle, comprising:
   a substrate having an ion exchange capacity of at least about 50 mEq/100 g and a plurality of ion exchange sites; and
   a plurality of disordered polyvalent metal oxides located at the plurality of ion exchange sites, wherein the polyvalent metal oxide comprises at least about 5 wt. % water of hydration, and wherein the substrate is vermiculite.

2. The sorbent particle of claim 1, wherein the plurality of metal oxides is a plurality of metal hydroxides.

3. The sorbent particle of claim 1, wherein the substrate is a silicate.

4. The sorbent particle of claim 3, wherein the substrate is a phyllosilicate.

5. The sorbent particle of claim 3, wherein the ion exchange capacity ranges from about 50 to about 150 mEq/100 g and wherein the metal oxide is a metal hydroxide.

6. The sorbent particle of claim 1, wherein the polyvalent metal oxide is poorly crystallized and wherein a plurality of sorbent particles are adhered to a common carrier substrate.

7. The sorbent particle of claim 1, wherein the polyvalent metal oxides comprise a plurality of different types of polyvalent metals selected from the group consisting of zirconium, aluminum, lanthanum, titanium, manganese, tin, iron, zinc, tungsten, and mixtures thereof.

8. The sorbent particle of claim 1, wherein the metal oxide comprises FeO(OH).

9. The sorbent particle of claim 1, wherein the polyvalent metal is selected from the group consisting of zirconium, aluminum, lanthanum, titanium, manganese, tin, iron, zinc, tungsten, and mixtures thereof.

10. The sorbent particle of claim 1, wherein the polyvalent metal is a transition metal.

11. The sorbent particle of claim 1, further comprising a plurality of ionic contaminants sorbed onto the sorbent particle.

12. A method for manufacturing a sorbent, comprising:
   (a) contacting a solution comprising dissolved polyvalent metal ions with a substrate having a plurality of ion exchange sites to form an ion exchanged substrate having polyvalent metal ions exchanged at the plurality of ion exchange sites, wherein the solution has an acidic pH; and
   (b) contacting the ion exchanged substrate with an oxygen-containing fluid to convert at least most of the polyvalent metal ions exchanged at the plurality of ion exchange sites into metal oxides, wherein the substrate is vermiculite.

13. The method of claim 12, wherein the polyvalent metal ions in step (a) are in the form of a salt in the solution, wherein step (b) follows step (a), and wherein, in step (b), the ion exchanged substrate is contacted with a source of hydroxyl ions to convert the ion-exchanged polyvalent metal ions into hydroxyl ions.

14. The method of claim 12, wherein the polyvalent metal is selected from the group consisting of zirconium, aluminum, lanthanum, titanium, manganese, tin, iron, zinc, tungsten, and mixtures thereof, wherein the solution in step (a) has a pH of less than about pH 2, wherein the fluid in step (b) is a liquid, and wherein the liquid has a basic pH.

15. The method of claim 12, wherein the polyvalent metal is a transition metal, wherein the polyvalent metal is electropositive, wherein the solution in step (a) has a pH of less than about pH 2, wherein the fluid in step (b) is a liquid, and wherein the liquid has a pH ranging from about pH 7 to about pH 8.

16. The method of claim 12, wherein the polyvalent metal oxide is poorly crystallized and wherein the metal oxide is in the form of a hydroxide.

17. The method of claim 12, wherein the polyvalent metal oxide comprises at least about 5% water of hydration.

18. The method of claim 12, wherein the substrate has an ion exchange capacity ranging from about 50 to about 150 mEq/100 g and wherein the polyvalent metal ions comprise a plurality of different types of transition metals.

19. The method of claim 12, wherein the polyvalent metal oxide is discontinuously distributed over the substrate and wherein a plurality of sorbent particles are located at differing locations on a carrier substrate.

20. The method of claim 12, wherein a concentration of the dissolved polyvalent metal in the solution is at least about 1 Molar.

21. The method of claim 12, wherein the polyvalent metal has a first valence state after the contacting step (b) and further comprising:
   thereafter oxidizing the polyvalent metal to a second valence state, the first valence state being less than the second valence state and wherein the metal oxide comprises FeO(OH).

22. The method of claim 21, wherein the polyvalent metal is manganese.

23. The sorbent particle of claim 11, wherein the at least one ionic contaminant is at least one of arsenic, selenium, copper, lead, cadmium, uranium, zinc, plutonium, phosphorus, molybdenum, mercury, and hydroxides and oxides thereof.

24. The sorbent particle of claim 1, wherein the polyvalent metal oxide is poorly crystallized and wherein the sorbent particle is free of calcining.

25. The sorbent particle of claim 1, wherein the substrate has an ion exchange capacity ranging from about 50 to about 150 mEq/g and wherein the metal oxide comprises a plurality of different types of transition metals.

* * * * *